(12) United States Patent
Fujiwara et al.

(10) Patent No.: US 12,117,250 B2
(45) Date of Patent: Oct. 15, 2024

(54) HEAT EXCHANGER WITH VARIABLE CROSS SECTIONAL FLOW PATH AREAS

(71) Applicant: Sumitomo Precision Products Co., Ltd., Amagasaki (JP)

(72) Inventors: Kota Fujiwara, Amagasaki (JP); Kazuya Umeyama, Amagasaki (JP)

(73) Assignee: Sumitomo Precision Products Co., Ltd, Amagasaki (JP)

( * ) Notice: Subject to any disclaimer, the term of this patent is extended or adjusted under 35 U.S.C. 154(b) by 290 days.

(21) Appl. No.: 17/763,039

(22) PCT Filed: Aug. 31, 2020

(86) PCT No.: PCT/JP2020/032918
§ 371 (c)(1),
(2) Date: Mar. 23, 2022

(87) PCT Pub. No.: WO2021/059877
PCT Pub. Date: Apr. 1, 2021

(65) Prior Publication Data
US 2022/0341683 A1    Oct. 27, 2022

(30) Foreign Application Priority Data
Sep. 24, 2019   (JP) .................................. 2019-172439

(51) Int. Cl.
*F28F 3/08*       (2006.01)
*B33Y 80/00*    (2015.01)
*F28F 13/08*     (2006.01)

(52) U.S. Cl.
CPC ................ *F28F 3/08* (2013.01); *B33Y 80/00* (2014.12); *F28F 13/08* (2013.01); *F28F 2250/106* (2013.01)

(58) Field of Classification Search
CPC ............... F28F 2255/00; F28F 2210/02; F28F 2210/06; F28F 1/025; F28F 1/006; F28F 2250/106; F28F 13/08; F28F 3/08
See application file for complete search history.

(56) References Cited

U.S. PATENT DOCUMENTS 5,002,123 A * 3/1991 Nelson .................... F28F 13/08
257/E23.098
5,573,062 A * 11/1996 Ooba ...................... B21C 37/16
165/184

(Continued)

FOREIGN PATENT DOCUMENTS

JP    2017-101914 A    6/2017

OTHER PUBLICATIONS

International Search Report (PCT/ISA/210) issued in PCT Application No. PCT/JP2020/032918 dated Oct. 13, 2020 with English translation (five (5) pages).

(Continued)

*Primary Examiner* — Travis Ruby
(74) *Attorney, Agent, or Firm* — Crowell & Moring LLP

(57) ABSTRACT

A heat exchanger (100) includes a flow path layer (10) in which a first flow path (11) extending in a first direction and a second flow path (12) extending in a second direction are disposed in the same layer. In each of the first flow path and the second flow path, a flow path cross-sectional area is reduced and expanded along an extending direction of the flow path. The first flow path and the second flow path intersect each other in the same layer in first portions (23, 33) of which the flow path cross-sectional area is reduced, due to displacement of the first portions (23, 33) in a third direction.

12 Claims, 17 Drawing Sheets

(56) References Cited

U.S. PATENT DOCUMENTS

| | | | | |
|---|---|---|---|---|
| 6,253,835 | B1* | 7/2001 | Chu | F28F 3/12 |
| | | | | 174/15.1 |
| 2006/0245987 | A1* | 11/2006 | Schmidt | B01J 19/249 |
| | | | | 422/198 |
| 2008/0149299 | A1* | 6/2008 | Slaughter | B22F 3/1115 |
| | | | | 430/269 |
| 2009/0032232 | A1* | 2/2009 | Murayama | F28D 9/0037 |
| | | | | 29/890.03 |
| 2013/0146259 | A1* | 6/2013 | Oh | H01L 23/473 |
| | | | | 165/104.34 |
| 2013/0206374 | A1* | 8/2013 | Roisin | F28D 7/0041 |
| | | | | 165/165 |
| 2015/0267966 | A1 | 9/2015 | Lin et al. | |
| 2017/0157722 | A1 | 6/2017 | Ranjan | |
| 2017/0198977 | A1* | 7/2017 | Herring | F28D 7/0066 |
| 2017/0284343 | A1* | 10/2017 | Nitta | F28D 1/06 |
| 2018/0051943 | A1* | 2/2018 | Gissen | F28F 3/048 |
| 2018/0187984 | A1* | 7/2018 | Manzo | F28F 13/12 |
| 2018/0238627 | A1* | 8/2018 | Herring | F28F 13/08 |
| 2018/0245853 | A1* | 8/2018 | Sennoun | B33Y 80/00 |
| 2018/0283795 | A1* | 10/2018 | Cerny | F28F 1/12 |
| 2018/0306516 | A1* | 10/2018 | Miller | F28F 7/02 |
| 2019/0024987 | A1* | 1/2019 | Moore | F28F 3/02 |
| 2019/0033013 | A1* | 1/2019 | Byfield | B22F 5/10 |
| 2019/0277576 | A1* | 9/2019 | Toubiana | F28D 9/0081 |

OTHER PUBLICATIONS

Japanese-language Written Opinion (PCT/ISA/237) issued in PCT Application No. PCT/JP2020/032918 dated Oct. 13, 2020 (three (3) pages).

* cited by examiner 510-510 CROSS SECTION (COMPARATIVE EXAMPLE)

(PRESENT EMBODIMENT)

(MODIFICATION EXAMPLE)

HEAT EXCHANGER WITH VARIABLE CROSS SECTIONAL FLOW PATH AREAS

TECHNICAL FIELD

The present invention relates to a heat exchanger, and more particularly to a heat exchanger that exchanges heat between fluids flowing through a flow path.

BACKGROUND ART

In the related art, heat exchangers that exchange heat between fluids flowing through a flow path have been known. For example, such a heat exchanger is disclosed in Japanese Unexamined Patent Application, First Publication No. 2017-101914.

There are various types of heat exchangers such as plate fin type heat exchangers and shell and tube type heat exchangers, and Japanese Unexamined Patent Application, First Publication No. 2017-101914 discloses the plate fin type heat exchanger. The heat exchanger of Japanese Unexamined Patent Application, First Publication No. 2017-101914 has a first layer that determines a first flow path and a second layer that is disposed above the first layer and determines a second flow path. There are a plurality of transverse fins across a flow direction in a single layer. An airflow is raised and lowered over the transverse fins, resulting in raising and lowering segments of the flow path. The transverse fins are disposed to break a temperature boundary layer and improve heat transfer coefficient.

CITATION LIST

Patent Literature

[PTL 1] Japanese Unexamined Patent Application, First Publication No. 2017-101914

SUMMARY OF INVENTION

Technical Problem

However, in Japanese Unexamined Patent Application, First Publication No. 2017-101914, since the fluid simply forms a simple two-dimensional flow in which the fluid is raised and lowered due to the transverse fins, there is an inconvenience that a flow turbulence for improving heat exchange efficiency is sufficiently not formed. Further, in Japanese Unexamined Patent Application, First Publication No. 2017-101914, since the heat exchange occurs between the first layer and the second layer in a lamination direction, a heat transfer area is determined by a boundary surface between the first layer and the second layer. Therefore, in order to improve the heat exchange efficiency, it is necessary to increase the area of each layer, which generates an increase in size and weight of the heat exchanger.

Meanwhile, in recent years, improvements in manufacturing technology represented by a laminate shaping method have been progressing, and it is becoming possible to realize a heat exchanger having a new structure different from the conventional one. From such as a background, there is a demand for a heat exchanger having a novel structure capable of improving heat exchange efficiency while suppressing an increase in the size and weight of the heat exchanger.

The present invention has been made to solve the above-mentioned problems, and one object of the present invention is to provide a heat exchanger capable of improving heat exchange efficiency while suppressing an increase in the size and weight of the heat exchanger.

Solution to Problem

In order to achieve the above object, according to an aspect of the present invention, there is provided a heat exchanger including a flow path layer in which a first flow path which has a tubular shape extending in a first direction and through which a first fluid flows and a second flow path which has a tubular shape extending in a second direction intersecting the first direction and through which a second fluid exchanging heat with the first fluid flows are disposed in the same layer, in which each of the first flow path and the second flow path is formed such that a flow path cross-sectional area is reduced and expanded along an extending direction of the flow path, and the first flow path and the second flow path intersect each other in the same layer in first portions of which the flow path cross-sectional area is reduced, due to displacement of the first portions in a third direction intersecting the first direction and the second direction. In addition, the fact that the first flow path and the second flow path are disposed in the same layer means that both the first flow path and the second flow path exist in a plane extending in the first direction and the second direction in a single flow path layer.

In the heat exchanger according to the present invention, according to the above configuration, each of the first flow path and the second flow path is displaced in the third direction in the first portion while reducing and expanding the flow path cross-sectional area. Accordingly, in each flow path, in addition to a change in a two-dimensional flow accompanying a change in a cross-sectional shape, a flow that changes three-dimensionally due to a change in the flow in the third direction can be formed. As a result, flow turbulence for improving a heat transfer coefficient can be effectively formed. Then, the first flow path and the second flow path can be formed so as to intersect each other in the same layer by using the first portion formed in each of the first flow path and the second flow path and displacing the position of the first portion in the third direction. Therefore, unlike a structure in which a heat transfer surface is formed only at a boundary between a layer of a first flow path and a layer of a second flow path (heat exchange only in the third direction) as in the conventional plate fin type heat exchanger, the heat transfer surface between the first flow path and the second flow path can be formed in a single flow path layer. As a result, when a size of the heat exchanger of the present invention is the same as that of the conventional heat exchanger, the heat transfer area can increase as compared with the conventional heat exchanger, and when the heat transfer area thereof is the same as that of the conventional heat exchanger, the size and weight of the heat exchanger can be reduced as compared with the conventional heat exchanger. As a result of the above, according to the present invention, it is possible to improve the heat exchange efficiency while suppressing the increase in the size and weight of the heat exchanger.

In the heat exchanger according to the above invention, preferably, each of the first flow path and the second flow path is partitioned by a partition wall bent so as to reduce and expand the flow path cross-sectional area, and the first flow path and the second flow path are partitioned from each other by a common partition wall in the same layer. With this configuration, a primary heat transfer surface can be configured by the partition wall of the first flow path and the second flow path in the same layer. Accordingly, it is not necessary to dispose fins to be secondary heat transfer surfaces in the flow path in order to change the flow path cross-sectional area, the first flow path and the second flow path can be directly adjacent to each other via the partition wall, and thus, the primary heat transfer surface between the first flow path and the second flow path can effectively increase. In addition, in this specification, bending is a broad concept including not only bending in a polygonal line but also bending in a curved line (curving).

In this case, preferably, the first flow path and the second flow path are partitioned by the partition wall inclined such that the cross-sectional area continuously changes according to a position in the extending direction of the flow path. With this configuration, it is possible to smooth the change in the flow path cross-sectional area as compared with a structure in which the flow path cross-sectional area changes abruptly due to, for example, a partition wall formed in a stepped shape. Therefore, in the first flow path and the second flow path, it is possible to suppress an excessive increase in a pressure loss while forming a change in the flow that improves the heat exchange efficiency.

The heat exchanger according to the above invention preferably includes a plurality of the flow path layers arranged in the third direction, in which the first flow path is provided so as to be adjacent to the second flow path in the same layer and adjacent to the second flow path in another flow path layer adjacent to the third direction, and the second flow path is provided so as to be adjacent to the first flow path in the same layer and adjacent to the first flow path in another flow path layer adjacent to the third direction. With this configuration, the first flow path can be not only in the same layer but also adjacent to the second flow path of another flow path layer, and the second flow path can be not only in the same layer but also adjacent to the first flow path of another flow path layer. Therefore, the heat transfer area between the first flow path and the second flow path can further increase, and thus, the heat exchange efficiency can be effectively improved.

In the heat exchanger according to the above invention, preferably, the flow path layer includes a plurality of the first flow paths arranged in the second direction and a plurality of the second flow paths arranged in the first direction, each of the first flow path and the second flow path has a plurality of the first portions along the extending direction of the flow path, and the first flow path and the second flow path meander such that a positional relationship between the first portion of the first flow path and the first portion of the second flow path intersecting each other in the third direction alternates. With this configuration, each of the first flow path and the second flow path disposed in the same layer can be displaced a plurality of times in the third direction. As a result, the flow can be changed in the third direction a plurality of times in each flow path, and thus, the heat exchange efficiency can be effectively improved.

In this case, preferably, the first flow path and the second flow path meander such that the first portion is displaced between a first position and a second position in the third direction according to a position in the extending direction of the flow path, and a formation range of the first portion at the first position in the third direction and a formation range of the first portion at the second position in the third direction are offset so as not to overlap in the third direction. With this configuration, in the first flow path, a region that linearly passes through the first portion at the first position and the first portion at the second position in the first direction is not formed. Similarly, in the second flow path, a region that passes linearly in the second direction is not formed. Therefore, while the fluid passes through the first position and the second position, it is possible to surely form a change in the flow in the third direction.

In the heat exchanger according to the above invention, preferably, the flow path layer includes a plurality of the first flow paths arranged in the second direction and a plurality of the second flow paths arranged in the first direction, each of the first flow path and the second flow path has a plurality of the first portions and a plurality of second portions having a flow path cross-sectional area larger than that of the first portion, and the first portion and the second portion are alternately disposed along the extending direction of the flow path. With this configuration, the reduction of the flow path cross-sectional area in the first portion and the expansion of the flow path cross-sectional area in the second portion can be alternately generated a plurality of times. Accordingly, the change of the flow accompanying the change of the cross-sectional shape can be effectively generated.

In this case, preferably, in each of the first flow path and the second flow path, an inlet opening or an outlet opening is configured by the second portion disposed at an end portion of the flow path. With this configuration, the fluid can be introduced into or out of the flow path from the enlarged second portion at the end portion of the flow path. Accordingly, it possible to secure a sufficient opening area for introducing and deriving the fluid even in a structure in which the flow path cross-sectional area changes.

The configuration in which the inlet opening or the outlet opening is configured by the second portion preferably includes a plurality of the flow path layers arranged in the third direction, the flow path layer has the inlet openings of the plurality of first flow paths on a first end surface on a first direction side and the outlet openings of the plurality of first flow paths on a second end surface on the first direction side, and the flow path layer has the inlet openings of the plurality of second flow paths on a third end surface on a second direction side and the outlet openings of the plurality of second flow paths on a fourth end surface on the second direction side. Here, in a structure in which the first layer and the second layer are alternately provided like the conventional plate fin type heat exchanger, in general, the inlet openings of the flow paths are formed every other layer, and each inlet opening is collectively covered by a header portion for connection with an external pipe. In this case, since the total area of the opening portions is smaller than the area covered by the header portion, the flow path is sharply narrowed between the header portion and the inlet opening of the flow path, resulting in pressure loss. Meanwhile, according to the above configuration of the present invention, the inlet opening or the outlet opening of the flow path can be collectively formed on the same end surface of each flow path layer, and thus, the area covered by the header portion and the total area of the openings can be brought close to each other. As a result, it is possible to suppress the occurrence of pressure loss at the inlet opening of the flow path.

In the heat exchanger according to the above invention, preferably, the flow path layer is configured by arranging a plurality of unit structures, each unit structure including one first flow path including one first portion and one second flow path including one first portion. With this configuration, it is possible to form a flow path layer including the first flow path and the second flow path that intersect each other while changing the flow path cross-sectional area in the same layer with a simple structure in which unit structures are arranged.

Then, a heat exchanger having an arbitrary number of flow paths and an arbitrary flow path length can be easily obtained only by increasing or decreasing the number of unit structures. As a result, even in a heat exchanger having a novel structure in which the shape of the flow path changes three-dimensionally, the design of the heat exchanger can be extremely facilitated.

In this case, preferably, the unit structure includes a first structure in which the first portion of the first flow path is disposed on one side of the third direction and the first portion of the second flow path is disposed on the other side of the third direction, and a second structure in which the first portion of the first flow path is disposed on the other side of the third direction and the first portion of the second flow path is disposed on the one side of the third direction and which is an inverted structure of the first structure, and the flow path layer has a structure in which the first structure and the second structure are arranged so as to be aligned alternately in at least one of the first direction and the second direction. With this configuration, only by arranging two types of unit structures, the first structure and the second structure that is the inverted structure of the first structure, it is possible to realize a structure in which the first flow path or the second flow path meanders in the third direction in the same layer. Accordingly, even in the structure including the flow path meandering in the third direction, the flow path layer can be easily designed.

When the flow path layer is configured by arranging the unit structures, preferably, in the unit structure, each of the first flow path and the second flow path has a second portion having a flow path cross-sectional area larger than that of the first portion at both ends, the first flow path is configured to extend in the first direction by connecting the second portions of the plurality of unit structures, and the second flow path is configured to extend in the second direction by connecting the second portions of the plurality of unit structures. With this configuration, it is possible to easily realize a structure in which the reduction and expansion of the flow path cross-sectional area alternately occur only by connecting the second portions in the unit structure.

Advantageous Effects of Invention

According to the present invention, as described above, it is possible to provide a heat exchanger capable of improving the heat exchange efficiency while suppressing an increase in the size and weight of the heat exchanger.

DESCRIPTION OF EMBODIMENTS

Hereinafter, embodiments of the present invention will be described with reference to the drawings.

First, a heat exchanger 100 according to one embodiment will be described with reference to FIGS. 1 to 20.

(Overall Configuration of Heat Exchanger)

Figure 1:
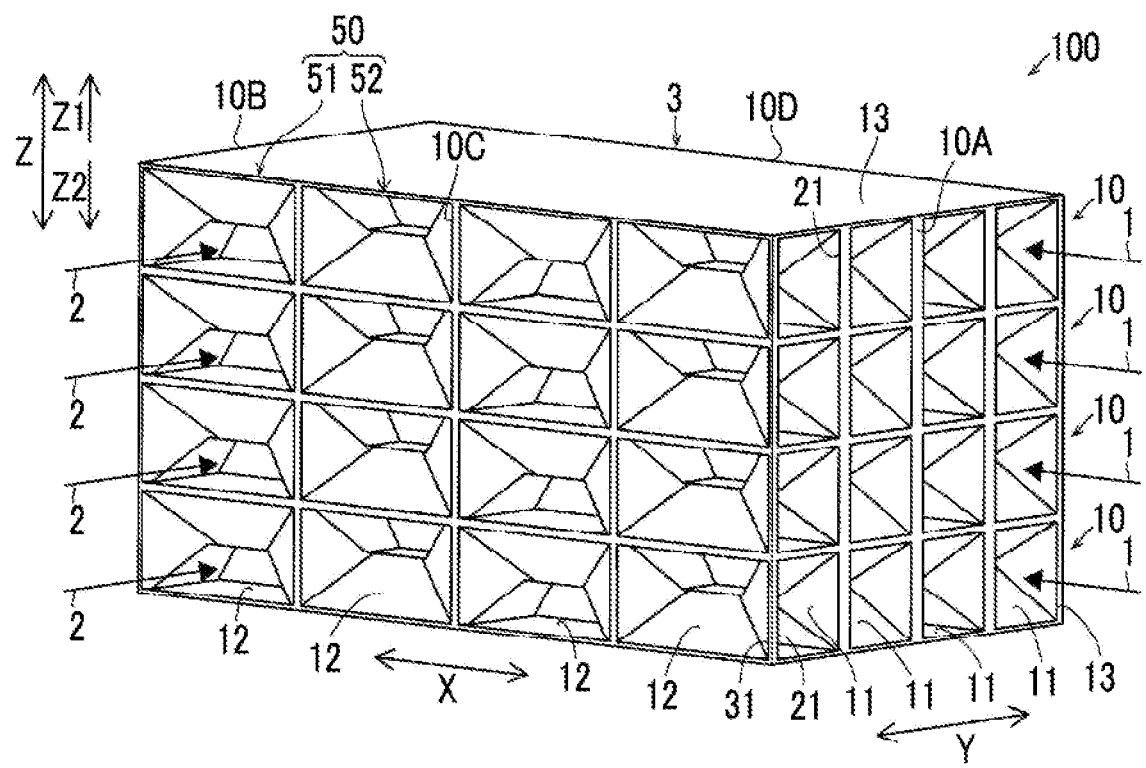
FIG. 1 is a schematic perspective view illustrating a heat exchanger according to the present embodiment.

As illustrated in FIG. 1, the heat exchanger 100 includes a flow path layer 10 in which the first flow path 11 and the second flow path 12 are disposed in the same layer.

The heat exchanger 100 includes at least one flow path layer 10. In the example of FIG. 1, the flow path layer 10 is a flat plate-like layer extending along X and Y directions orthogonal to each other. The flow path layer 10 has a predetermined thickness in a Z direction orthogonal to the X direction and the Y direction. In the example of FIG. 1, the flow path layer 10 has a rectangular shape when viewed from the Z direction. The X direction is an example of a "first direction" of claims. The Y direction is an example of a "second direction" of claims. The Z direction is an example of a "third direction" of claims.

The flow path layer 10 includes at least one first flow path 11 and at least one second flow path 12. The first flow path 11 and the second flow path 12 are fluidly independent flow paths from each other. In the example of FIG. 1, the flow path layer 10 includes a plurality of the first flow paths 11 arranged in the Y direction and a plurality of the second flow paths 12 arranged in the X direction. Specifically, the flow path layer 10 includes four first flow paths 11 and four second flow paths 12. The number of the first flow path 11 and the number of the second flow path 12 included in the flow path layer 10 are arbitrary and may be different from each other.

The first flow path 11 has a tubular shape extending in the X direction. The first flow path 11 is configured such that a first fluid 1 flows through the first flow path 11. The first flow path 11 is a hollow passage partitioned by the partition wall 13. The fact that the first flow path 11 extends in the X direction means that the first flow path 11 extends in the X direction as a whole, and does not have to have a linear shape that is strictly oriented in the X direction. The four first flow paths 11 are arranged in the Y direction.

The second flow path 12 has a tubular shape extending in the Y direction intersecting the X direction. The second flow path 12 is configured such that a second fluid 2 that exchanges heat with the first fluid 1 flows through the second flow path 12. The second flow path 12 is a hollow passage partitioned by the partition wall 13. The fact that the second flow path 12 extends in the Y direction means that the second flow path 12 extends in the Y direction as a whole, and does not have to have a linear shape that is strictly oriented in the Y direction. The four second flow paths 12 are arranged in the X direction.

In the example of FIG. 1, the heat exchanger 100 includes a plurality of the flow path layers 10 arranged in the Z direction. Specifically, four flow path layers 10 are provided. Each flow path layer 10 has the same shape. The adjacent flow path layers 10 are partitioned by the partition wall 13 having a flat plate shape. In the example of FIG. 1, a core portion 3 of the heat exchanger 100 is configured by the four flow path layers 10 arranged in the Z direction. In the core portion 3, heat exchange is performed between the first fluid 1 flowing through each of the first flow paths 11 and the second fluid 2 flowing through each of the second flow paths 12. The core portion 3 has a rectangular parallelepiped shape as a whole due to the four flow path layers 10.

Figure 2:
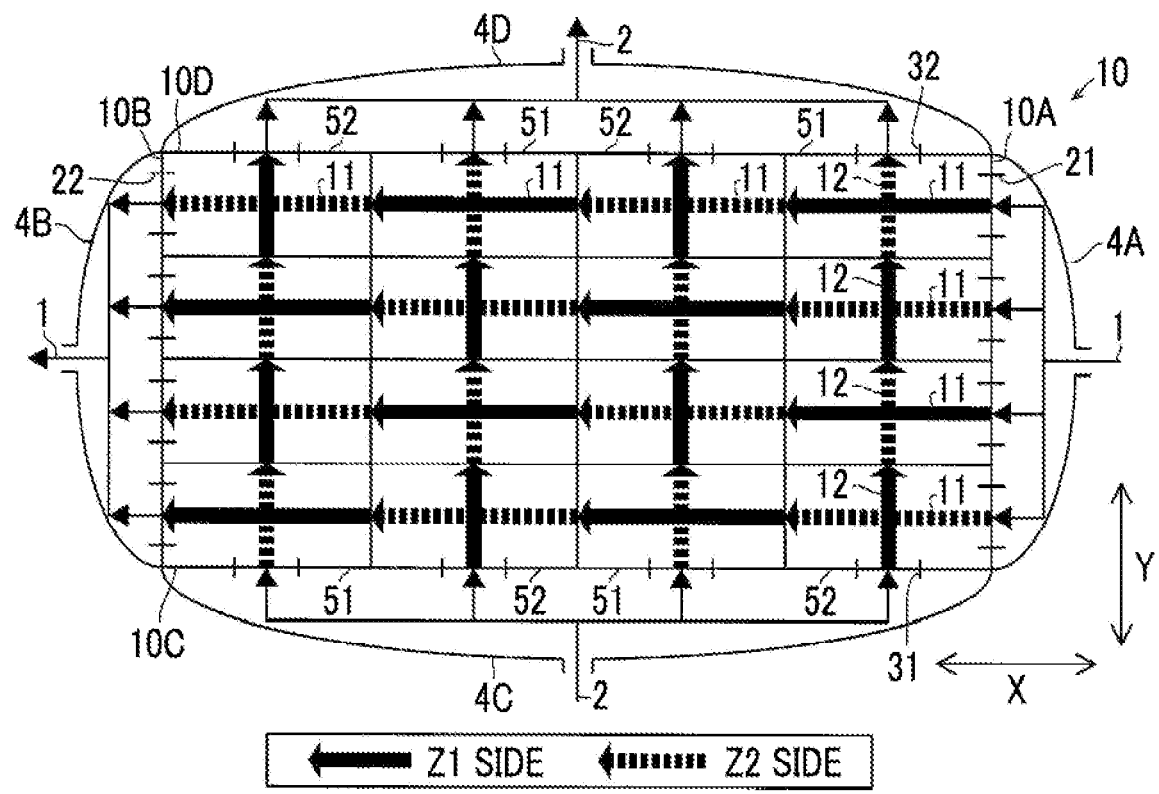
FIG. 2 is a schematic plan view for describing outlines of a first flow path and a second flow path.

As illustrated in FIGS. 1 and 2, the flow path layer 10 has a first end surface 10A and a second end surface 10B on a side opposite to the first end surface 10A at end portions on the X direction side. The flow path layer 10 has a third end surface 10C and a fourth end surface 10D on a side opposite to the third end surface 10C at end portions on the Y direction side.

Figure 6:
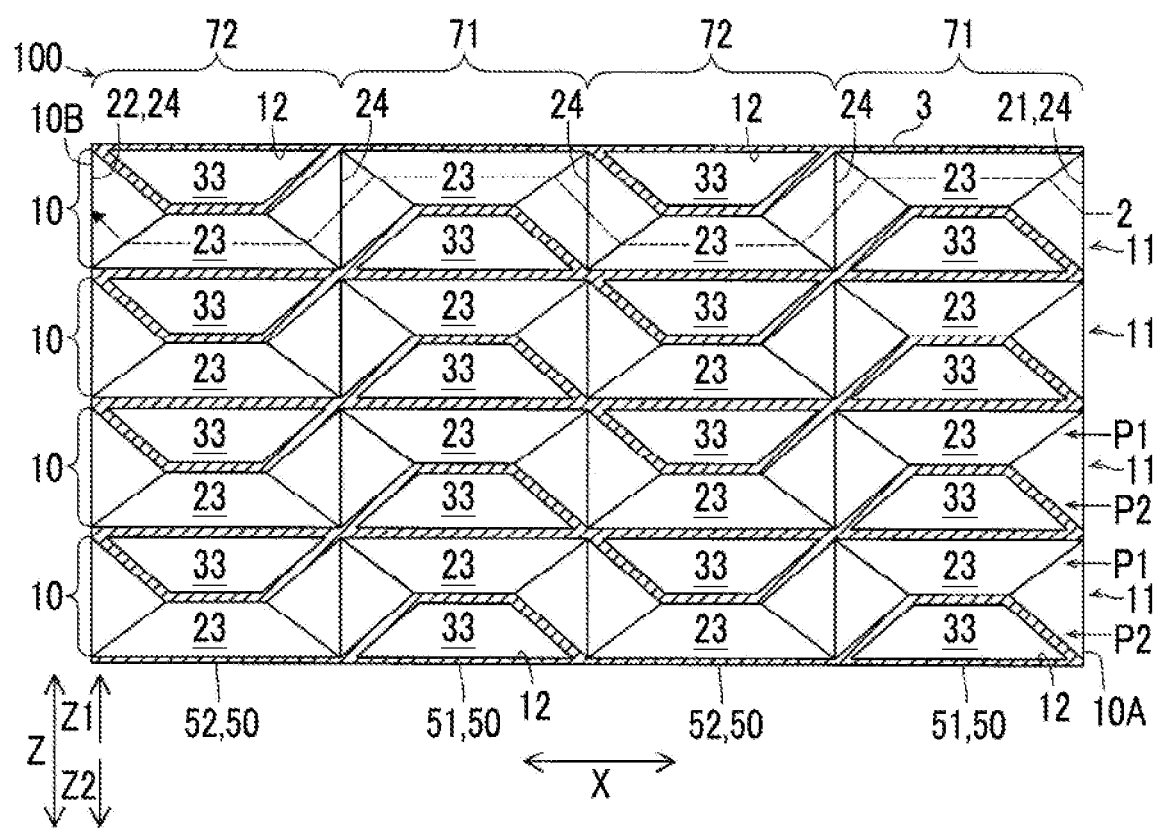
FIG. 6 is a cross-sectional view of the core portion as viewed from the Y direction.

As illustrated in FIGS. 2 and 6, the first flow path 11 is formed so as to extend from the first end surface 10A to the second end surface 10B in the flow path layer 10, and penetrates the flow path layer 10 in the X direction. The first flow path 11 has one end portion and the other end portion. The first flow path 11 has an inlet opening 21 at one end portion and an outlet opening 22 at the other end portion. Each flow path layer 10 has the inlet openings 21 of the plurality (four) of first flow paths 11 on the first end surface 10A on the X direction side, and the outlet openings 22 of the plurality (four) of first flow paths 11 on the second end surface 10B on the X direction side.

Figure 3:
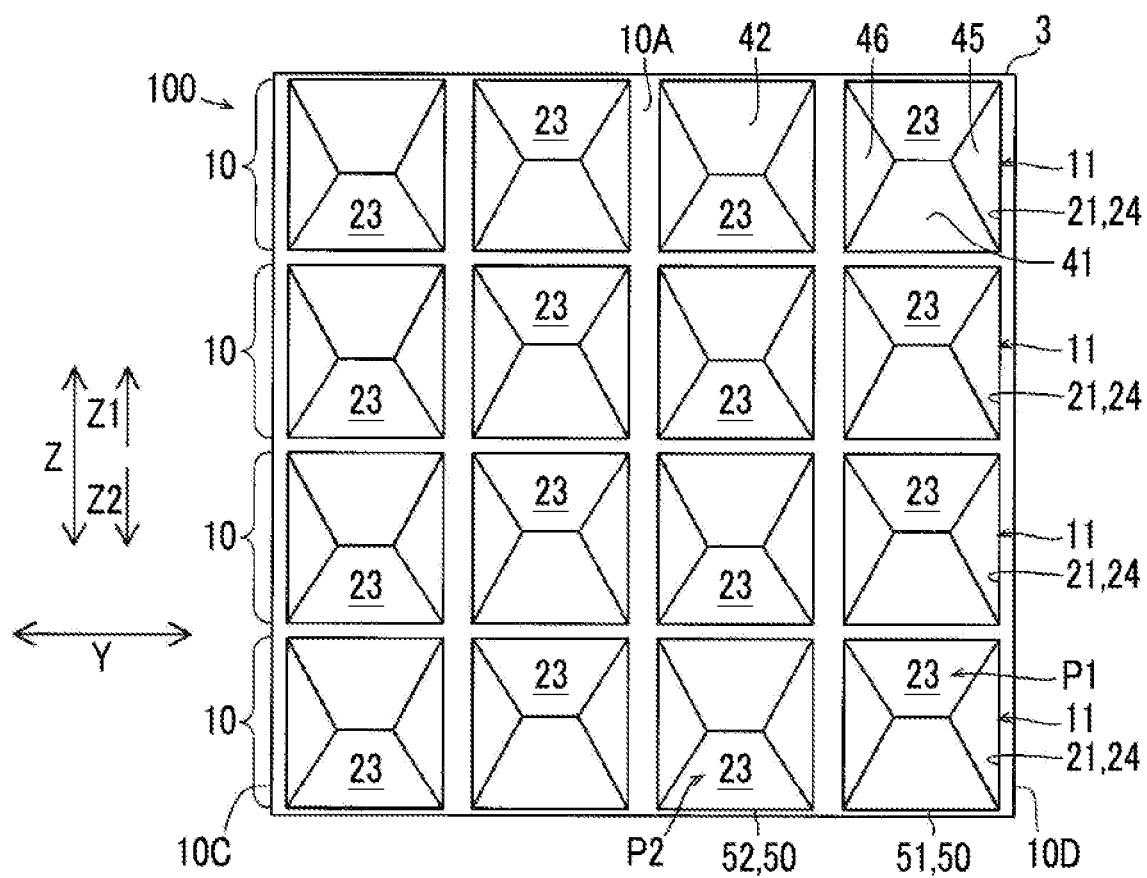
FIG. 3 is a side view of a core portion of the heat exchanger as viewed from an X direction.

Therefore, as illustrated in FIG. 3, in the first end surface 10A, the inlet openings 21 of the four first flow paths 11 in the same layer are provided to be arranged in the Y direction, and the inlet openings 21 in the respective flow path layers 10 are provided to be arranged in the Z direction. In the core portion 3, a total of 16 inlet openings 21 are disposed to be arranged in a matrix in the Y direction and the Z direction by the four flow path layers 10. The disposition of the outlet openings 22 of the first flow paths 11 on the second end surface 10B is the same, and thus, the illustration thereof is omitted. In the core portion 3, a total of 16 outlet openings 22 are disposed to be arranged in a matrix in the Y direction and the Z direction by the four flow path layers 10.

Figure 4:
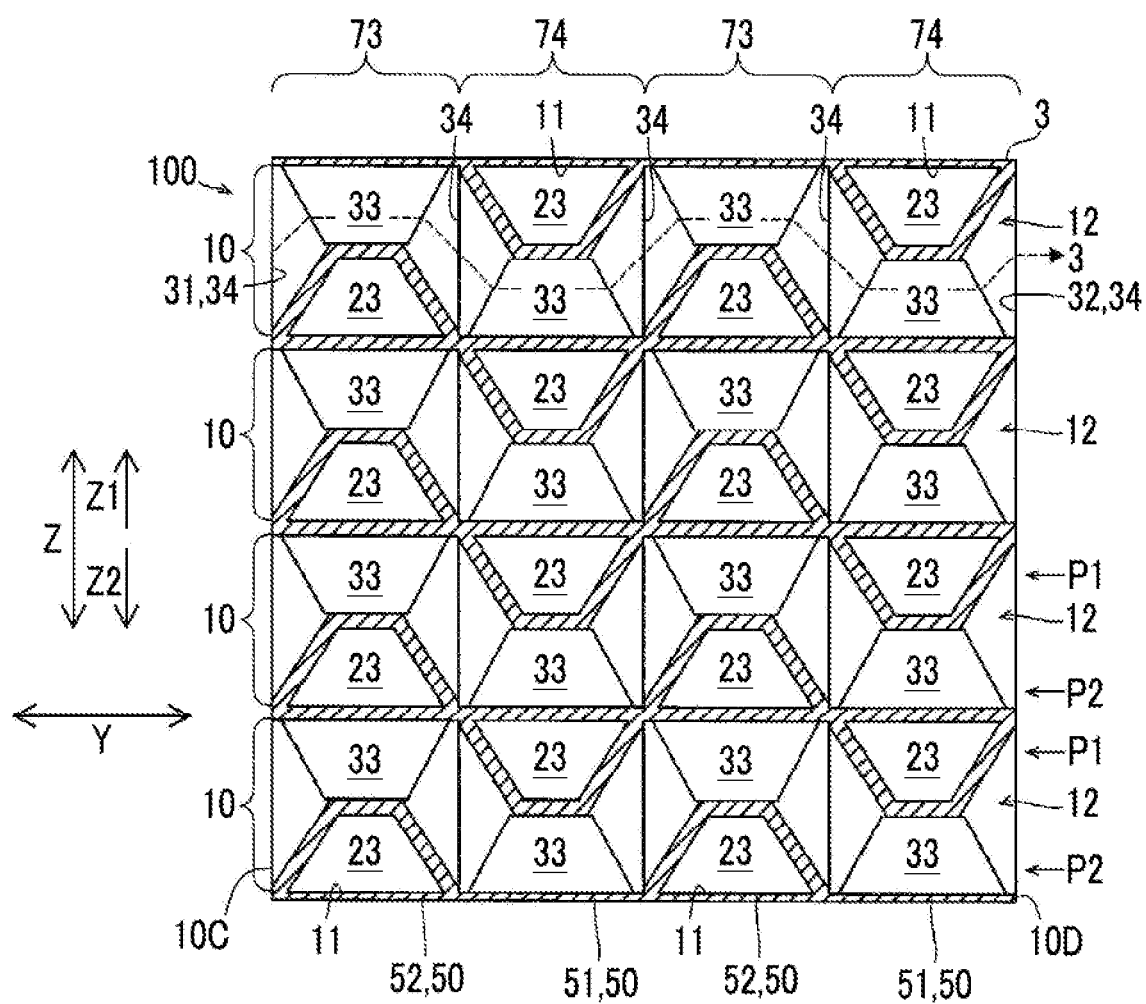
FIG. 4 is a cross-sectional view of the core portion as viewed from the X direction.

As illustrated in FIGS. 2 and 4, the second flow path 12 is formed so as to extend from the third end surface 10C to the fourth end surface 10D in the flow path layer 10, and penetrates the flow path layer 10 in the Y direction. The second flow path 12 has one end portion and the other end portion. The second flow path 12 has an inlet opening 31 at one end portion and an outlet opening 32 at the other end portion. The flow path layer 10 has the inlet openings 31 of the plurality of second flow paths 12 on the third end surface 10C on the Y direction side, and the outlet openings 32 of the plurality of second flow paths 12 on the fourth end surface 10D on the Y direction side.

Figure 5:
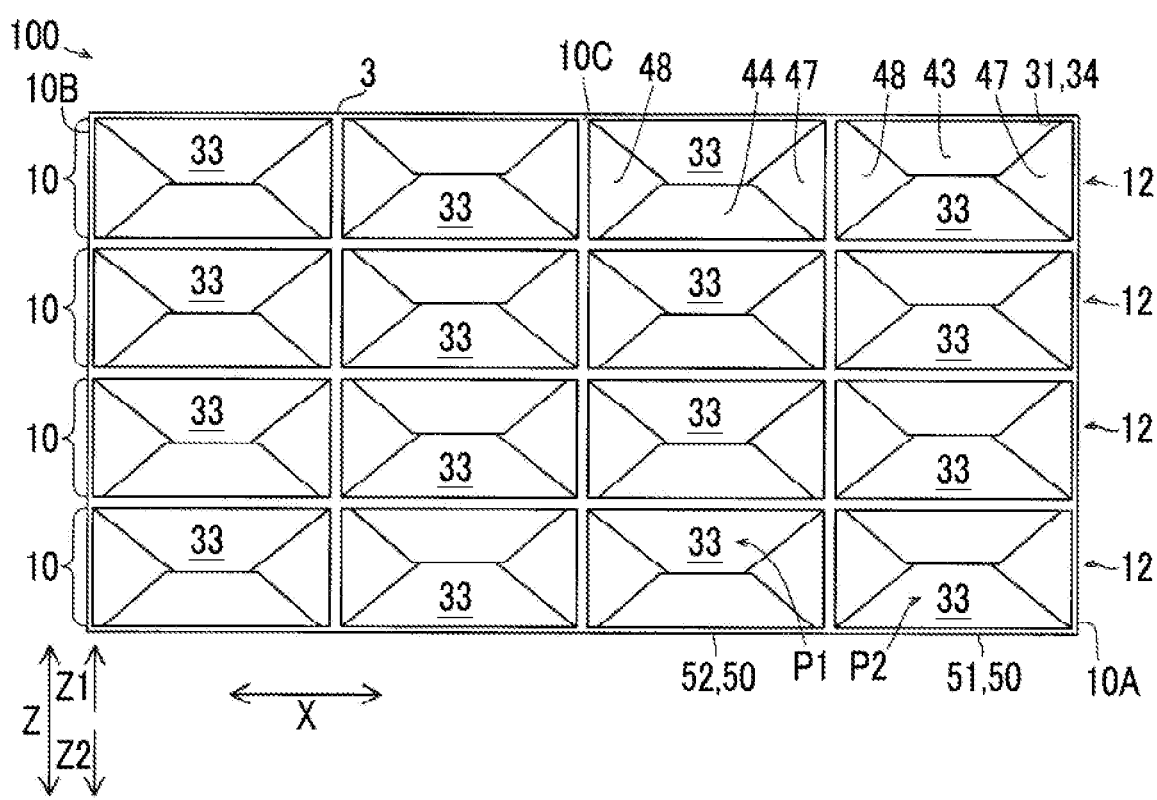
FIG. 5 is a side view of the core portion of the heat exchanger as viewed from an Y direction.

Therefore, as illustrated in FIG. 5, in the third end surface 10C, the inlet openings 31 of four second flow paths 12 in the same layer are provided to be arranged in the X direction, and the inlet openings 31 in the respective flow path layers 10 are provided to be arranged in the Z direction. In the core portion 3, a total of 16 inlet openings 31 are disposed to be arranged in a matrix in the X direction and the Z direction by the four flow path layers 10. The disposition of the outlet opening 32 of the second flow path 12 on the fourth end surface 10D is the same, and thus, the illustration thereof is omitted. In the core portion 3, a total of 16 outlet openings 32 are disposed to be arranged in a matrix in the X direction and the Z direction by the four flow path layers 10.

As illustrated in FIG. 2, the heat exchanger 100 includes header portions 4A to 4D for separately connecting the inlet openings 21 of the first flow paths 11, the outlet openings 22 of the first flow paths 11, the inlet openings 31 of the second flow paths 12, and the outlet openings 32 of the second flow paths 12 to an external pipe. The header portions 4A to 4D are provided so as to collectively cover a plurality of corresponding inlet openings or outlet openings.

The header portion 4A covers the 16 inlet openings 21 formed on the first end surface 10A, and distributes the first fluid 1 sent from the external pipe to each inlet opening 21. The header portion 4B covers the 16 outlet openings 22 formed on the second end surface 10B, joins the first fluid 1 flowing out from each outlet opening 22, and sends the first fluid to the external pipe. The header portion 4C covers the 16 inlet openings 31 formed on the third end surface 10C, and distributes the second fluid 2 sent from the external pipe to each inlet opening 31. The header portion 4D covers the 16 outlet openings 32 formed on the fourth end surface 10D, joins the second fluid 2 flowing out from each outlet opening 32, and sends the second fluid to the external pipe.

As described above, the heat exchanger 100 of the present embodiment is configured as an orthogonal flow type heat exchanger in which the first fluid 1 flows in the X direction from the first end surface 10A to the second end surface 10B through the first flow path 11, the second fluid 2 flows in the Y direction from the third end surface 10C to the fourth end surface 10D through the second flow path 12, and thus, heat exchange is performed. In the orthogonal flow type heat exchanger, the fluids that exchange heat flow in directions orthogonal to each other.

(Structure of Flow Path)

Next, detailed structures of the first flow path 11 and the second flow path 12 will be described.

<Change in Cross-Sectional Shape of Flow Path>

In the present embodiment, each of the first flow path 11 and the second flow path 12 is formed such that a flow path cross-sectional area is reduced and expanded along an extending direction of the flow path. In the present specification, the flow path cross-sectional area is an area of the flow path (space through which the fluid flows) in a cross section orthogonal to the extending direction of the flow path.

Figure 7:
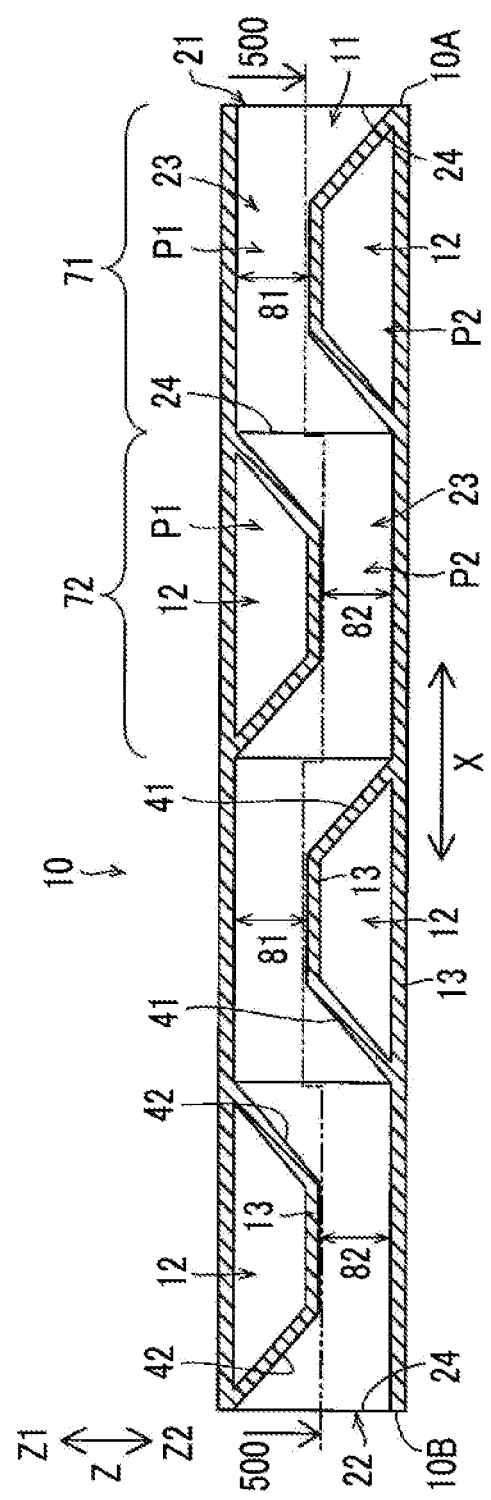
FIG. 7 is a schematic cross-sectional view of the first flow path as viewed from the Y direction.
Figure 8:
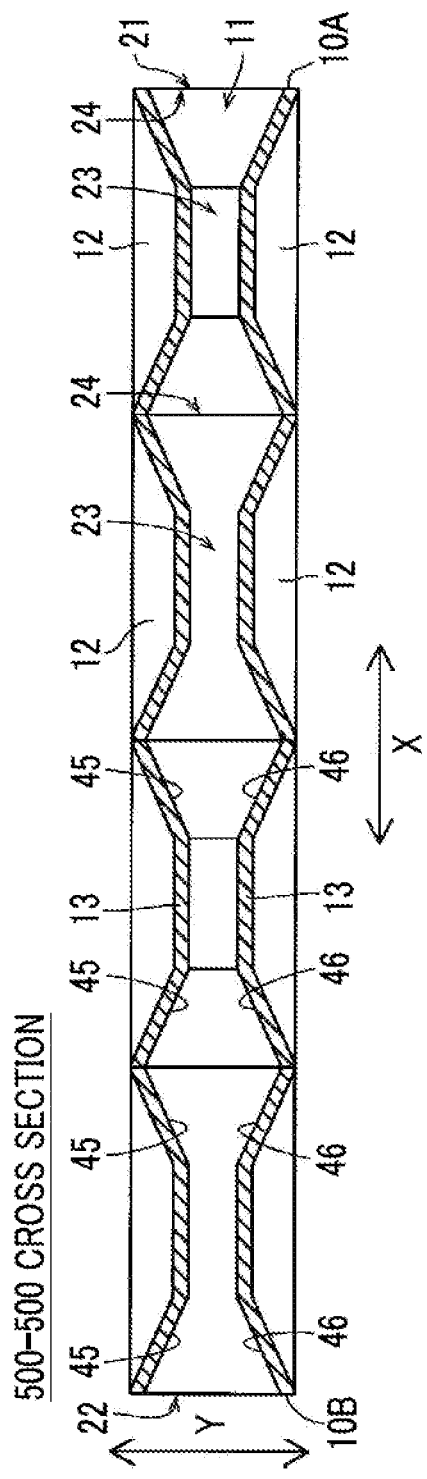
FIG. 8 is a combined cross-sectional view taken along line 500-500 of FIG. 7.

As illustrated in FIGS. 7 and 8, the first flow path 11 includes a first portion 23 having a reduced flow path cross-sectional area. Further, the first flow path 11 includes a second portion 24 having a flow path cross-sectional area larger than that of the first portion 23.

The first flow path 11 has the minimum flow path cross-sectional area in the first portion 23. The first flow path 11 has the maximum flow path cross-sectional area in the second portion 24. In the first portion 23, a cross section of the flow path has a trapezoidal shape as illustrated in FIG. 4. In the second portion 24, a cross section of the flow path has a rectangular shape as illustrated in FIG. 3. As illustrated in FIGS. 7 and 8, the flow path cross-sectional area of the first flow path 11 is reduced from the second portion 24 to the first portion 23, and the flow path cross-sectional area thereof is expanded from the first portion 23 to the second portion 24.

Figure 9:
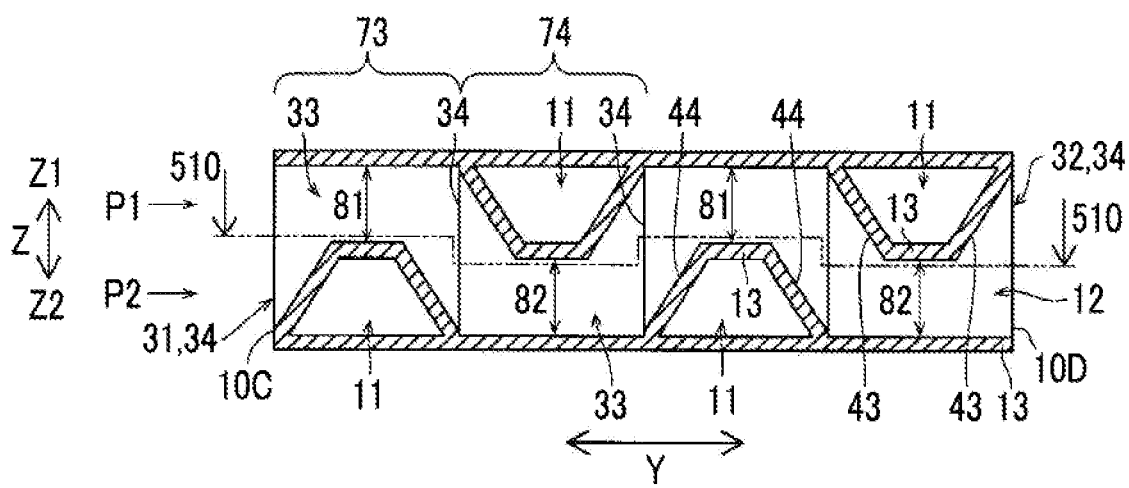
FIG. 9 is a schematic cross-sectional view of the second flow path as viewed from the X direction.
Figure 10:
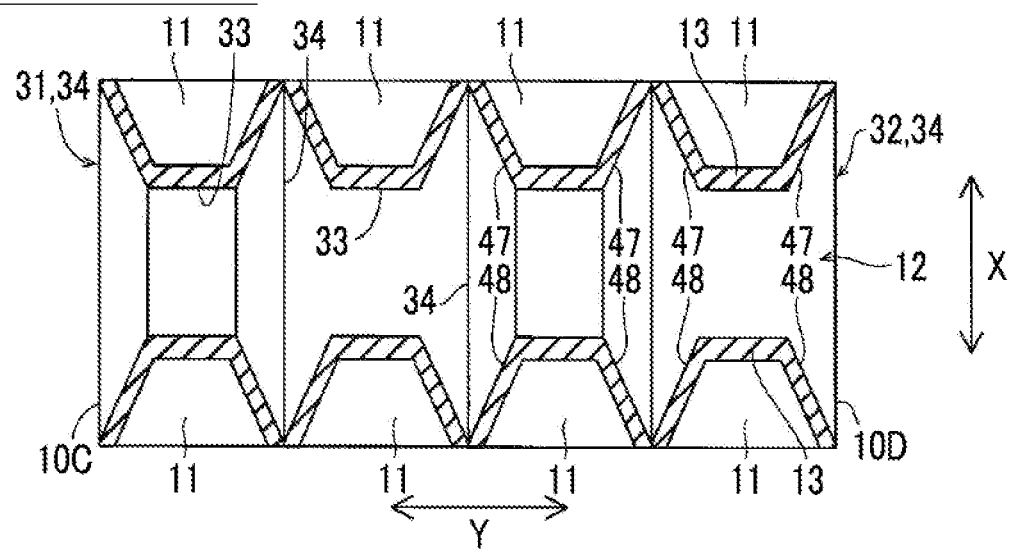
FIG. 10 is a combined cross-sectional view taken along line 510-510 of FIG. 9.

As illustrated in FIGS. 9 and 10, the second flow path 12 includes a first portion 33 having a reduced flow path cross-sectional area. Further, the second flow path 12 includes a second portion 34 having a flow path cross-sectional area larger than that of the first portion 33.

The second flow path 12 has the minimum flow path cross-sectional area in the first portion 33. The second flow path 12 has the maximum flow path cross-sectional area in the second portion 34. In the first portion 33, the cross section of the flow path has a trapezoidal shape as illustrated in FIG. 6. In the second portion 34, the cross section of the flow path has a rectangular shape as illustrated in FIG. 5. As illustrated in FIGS. 9 and 10, the flow path cross-sectional area of the second flow path 12 is reduced from the second portion 34 to the first portion 33, and the flow path cross-sectional area thereof is expanded from the first portion 33 to the second portion 34.

As described above, the first flow path 11 and the second flow path 12 each have a plurality of the first portions 23 and 33 and a plurality of the second portions 24 and 34. Then, in each flow path, the first portions 23 and 33 and the second portions 24 and 34 are alternately disposed along the extending direction of the flow path. Therefore, in each of the first flow path 11 and the second flow path 12, the flow path cross-sectional area is formed so as to be reduced and expanded alternately.

Further, in each of the first flow path 11 and the second flow path 12, the inlet opening or the outlet opening is configured by the second portions 24 and 34 disposed at end portions of the flow path.

That is, in the first flow path 11 (refer to FIGS. 7, 8, and 1), the inlet opening 21 is configured by the second portion 24 of the first end surface 10A, and the outlet opening 22 is configured by the second portion 24 of the second end surface 10B. Similarly, in the second flow path 12 (refer to FIGS. 9, 10, and 1), the inlet opening 31 is configured by the second portion 34 of the third end surface 10C and the outlet opening 32 is configured by the second portion 34 of the fourth end surface 10D.

<Intersection of First Flow Path and Second Flow Path>

Further, in the first flow path 11 and the second flow path 12, the first portions 23 and 33 of which the flow path cross-sectional areas are reduced are displaced in the Z direction intersecting the X direction and the Y direction, and thus, the first flow path 11 and the second flow path 12 intersect each other in the same layer at the first portions 23 and 33.

For example, as illustrated in FIG. 6, in a region 71, the first portion 23 of the first flow path 11 is displaced so as to be biased in a Z1 direction. Then, in the same region 71, the first portion 33 of the second flow path 12 is displaced so as to be biased in a Z2 direction, and thus, the second flow path 12 intersects the first flow path 11. In the region 71, the first flow path 11 (first portion 23) extends in the X direction so as to straddle the Z1 direction side of the second flow path 12, and the second flow path 12 (first portion 33) extends in the Y direction so as to pass through the Z2 direction side of the first flow path 11.

Further, in a region 72, the first portion 23 of the first flow path 11 is displaced so as to be biased in the Z2 direction. Then, in the region 72, the first portion 33 of the second flow path 12 is displaced so as to be biased in the Z1 direction, and thus, the second flow path 12 intersects the first flow path 11. In the region 72, the first flow path 11 (first portion 23) extends in the X direction so as to pass through the Z2 direction side of the second flow path 12, and the second flow path 12 (first portion 33) extends in the Y direction so as to straddle the Z1 direction side of the first flow path 11.

The same applies to the second flow path 12. As illustrated in FIG. 4, in a region 73, the first portion 33 of the second flow path 12 is displaced so as to be biased in the Z1 direction, and thus, the second flow path 12 intersects the first flow path 11 displaced to be biased in the Z2 direction. In a region 74, the first portion 33 of the second flow path 12 is displaced so as to be biased in the Z2 direction, and thus, the second flow path 12 intersects the first flow path 11 displaced to be biased in the Z1 direction.

In the present embodiment, the first flow path 11 and the second flow path 12 meander such that a positional relationship between the first portion 23 of the first flow path 11 and the first portion 33 of the second flow path 12 intersecting each other in the Z direction alternates.

That is, as illustrated in FIG. 6, in the first flow path 11, the region 71 in which the first portion 23 is biased in the Z1 direction and located on the Z1 direction side with respect to the second flow path 12 and the region 72 in which the first portion 23 is biased in the Z2 direction and located on the Z2 direction side with respect to the second flow path 12 appear alternately along the X direction. In the region 71, the first portion 23 is located at a first position P1 in the Z direction, and in the region 72, the first portion 23 is located at a second position P2 in the Z direction.

Further, as illustrated in FIG. 4, in the second flow path 12, the region 73 in which the first portion 33 is biased in the Z1 direction and located on the Z1 direction side with respect to the first flow path 11 and the region 74 in which the first portion 33 is biased in the Z2 direction and located on the Z2 direction side with respect to the first flow path 11 appear alternately along the Y direction. In the region 73, the first portion 33 is located at the first position P1 in the Z direction, and in the region 74, the first portion 33 is located at the second position P2 in the Z direction.

As described above, in the first flow path 11 and the second flow path 12, the first portions 23 and 33 meander to be displaced between the first position P1 and the second position P2 in the Z direction according to the position in the extending direction of the flow path.

Here, in the present embodiment, a formation range of each of the first portions 23 and 33 at the first position P1 in the Z direction and a formation range of each of the first portions 23 and 33 at the second position P2 in the Z direction are offset so as not to overlap each other in the Z direction.

That is, as illustrated in FIG. 7, in the first flow path 11, the first portion 23 at the first position P1 is formed over a range 81 in the Z direction. The first portion 23 at the second position P2 is formed over the range 82 in the Z direction. In the Z direction, the range 81 and the range 82 do not overlap each other.

Similarly, in the second flow path 12, as illustrated in FIG. 9, the first portion 33 at the first position P1 is formed over the range 81 in the Z direction. The first portion 33 at the second position P2 is formed over the range 82 in the Z direction. In the Z direction, the range 81 and the range 82 do not overlap each other.

That is, in the present embodiment, the first flow path 11 and the second flow path 12 are formed so as to bisect the flow path layer 10 in the Z direction in each of the first portions 23 and 33, and the range 81 and the range 82 bisect the flow path layer 10 in the Z direction. Therefore, the formation ranges of the first portions 23 and 33 do not overlap each other at the first position P1 and the second position P2.

<Partition Wall Between Flow Paths>

As illustrated in FIGS. 7 to 10, each of the first flow path 11 and the second flow path 12 is partitioned by a partition wall 13 bent so as to reduce and expand the flow path cross-sectional area. The first portion 23 and the second portion 24 of the first flow path 11 and the first portion 33 and the second portion 34 of the second flow path 12 are formed by the partition wall 13.

In FIG. 7, the first flow path 11 crosses the Z1 direction side or the Z2 direction side of the second flow path 12 having a trapezoidal cross section in the X direction. The partition wall 13 is bent so as to partition the second flow path 12 having a trapezoidal cross section and the meandering first flow path 11. The partition wall 13 protrudes into the flow path layer 10 so as to form the second flow path 12 having a trapezoidal cross section. Then, the partition wall 13 protruding into the flow path layer 10 partitions the first portion 23 in which the flow path cross-sectional area of the first flow path 11 is reduced.

In FIG. 9, the second flow path 12 crosses the Z1 direction side or the Z2 direction side of the first flow path 11 having a trapezoidal cross section in the Y direction. The partition wall 13 is bent so as to partition the first flow path 11 having a trapezoidal cross section and the meandering second flow path 12. The partition wall 13 protrudes into the flow path layer 10 so as to form the first flow path 11 having a trapezoidal cross section. Then, the partition wall 13 protruding into the flow path layer 10 partitions the first portion 33 in which the flow path cross-sectional area of the second flow path 12 is reduced.

In this way, the first flow path 11 and the second flow path 12 are partitioned from each other by the common partition wall 13 in the same layer. The first flow path 11 and the second flow path 12 are adjacent to each other via the partition wall 13. Therefore, the partition wall 13 constitutes a primary heat transfer surface when heat exchange is performed between the first flow path 11 and the second flow path 12.

Further, the first flow path 11 and the second flow path 12 are partitioned by the inclined partition wall 13 such that the cross-sectional areas thereof continuously change according to the positions in the extending directions of the flow paths.

As illustrated in FIGS. 5 and 3 (FIGS. 7 and 9), the partition wall 13 has inclined surfaces 41, 42, 43, and 44 inclined so as to protrude from an outer edge portion of the flow path layer 10 toward a center of the flow path layer 10 in the Z direction. As illustrated in FIGS. 3 and 8, the partition wall 13 has inclined surfaces 45 and 46 inclined so as to protrude from the outer edge portion of the flow path layer 10 toward the center of the flow path layer 10 in the Y direction. As illustrated in FIGS. 5 and 10, the partition wall 13 has inclined surfaces 47 and 48 inclined so as to protrude from the outer edge portion of the flow path layer 10 toward the center of the flow path layer 10 in the X direction.

Therefore, in the first flow path 11, a flow path height in the Z direction is continuously changed by the inclined surfaces 41 and 42 (refer to FIG. 7) of the partition wall 13, and a flow path width in the Y direction is continuously changed by the inclined surfaces 45 and 46 (refer to FIG. 8) of the partition wall 13. The first flow path 11 is formed such that the flow path height is reduced and expanded along the extending direction of the flow path, and is formed such that the flow path width is reduced and expanded along the extending direction of the flow path.

Similarly, in the second flow path 12, the flow path height in the Z direction is continuously changed by the inclined surfaces 43 and 44 (refer to FIG. 9) of the partition wall 13, and the flow path width in the X direction is continuously changed by the inclined surfaces 47 and 48 (refer to FIG. 10) of the partition wall 13. The second flow path 12 is formed such that the flow path height is reduced and expanded along the extending direction of the flow path, and is formed such that the flow path width is reduced and expanded along the extending direction of the flow path.

As a result, the flow the first fluid 1 in the first flow path 11 is affected by the change in the flow path height in the Z direction, the change in the flow path width in the Y direction, and the change in the position meandering in the Z direction, and thus, a three-dimensional change occurs in the flow. Similarly, the flow of the second fluid 2 in the second flow path 12 is affected by the change in the flow path height in the Z direction, the change in the flow path width in the X direction, and the change in the position meandering in the Z direction, and thus, a three-dimensional change occurs in the flow.

<Positional Relationship with Flow Path in Another Adjacent Flow Path Layer>

Further, as illustrated in FIG. 6, the first flow path 11 is provided to be adjacent to the second flow path 12 in the same layer and to be adjacent to the second flow path 12 in another flow path layer 10 adjacent in the Z direction. As can be seen from FIG. 6, the first flow path 11 is adjacent to the second flow path 12 in the same layer on one side in the Z1 direction and the Z2 direction, and is adjacent to the second flow path 12 in another adjacent flow path layer 10 on the other side in the Z1 direction and the Z2 direction via the partition wall 13.

Similarly, as illustrated in FIG. 4, the second flow path 12 is provided to be adjacent to the first flow path 11 in the same layer and to be adjacent to the first flow path 11 in another flow path layer 10 adjacent in the Z direction. As can be seen from FIG. 4, the second flow path 12 is adjacent to the first flow path 11 in the same layer on one side in the Z1 direction and the Z2 direction, and is adjacent to the first flow path 11 in another adjacent flow path layer 10 on the other side in the Z1 direction and the Z2 direction via the partition wall 13.

As illustrated in FIG. 4, the first flow path 11 is adjacent to the second flow path 12 in the same layer on both sides in the Y direction via the partition wall. As illustrated in FIG.

6, the second flow path 12 is adjacent to the first flow path 11 in the same layer on both sides in the X direction via the partition wall.

As described above, in the present embodiment, the first flow paths 11 and the second flow paths 12 are all configured to be adjacent to each other via the primary heat transfer surface.

(Unit Structure)

Figure 11:
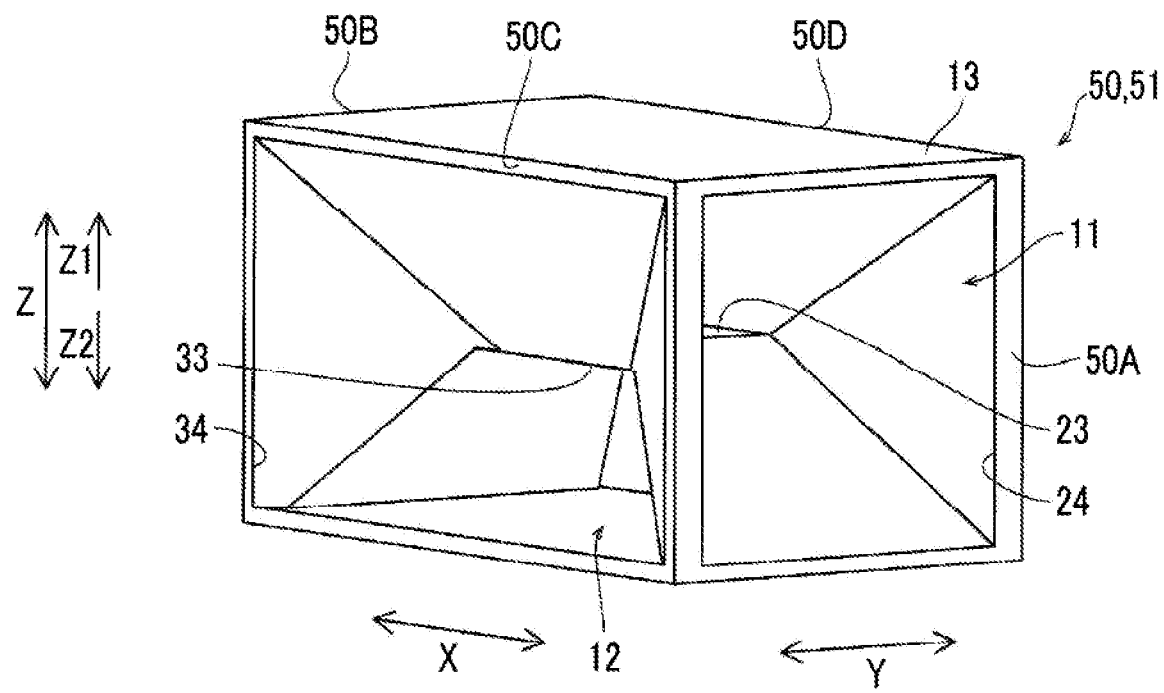
FIG. 11 is a perspective view illustrating an example of a unit structure.

The flow path layer 10 illustrated in FIGS. 1 to 10 is configured by arranging a plurality of unit structures 50 (refer to FIG. 11). As illustrated in FIG. 11, the unit structure 50 is the smallest unit of the flow path layer 10 in which one first flow path 11 and one second flow path 12 are formed. The flow path layer 10 has a periodic structure in which the unit structures 50 repeatedly appear.

<Structure of Unit Structure>

Figure 12:
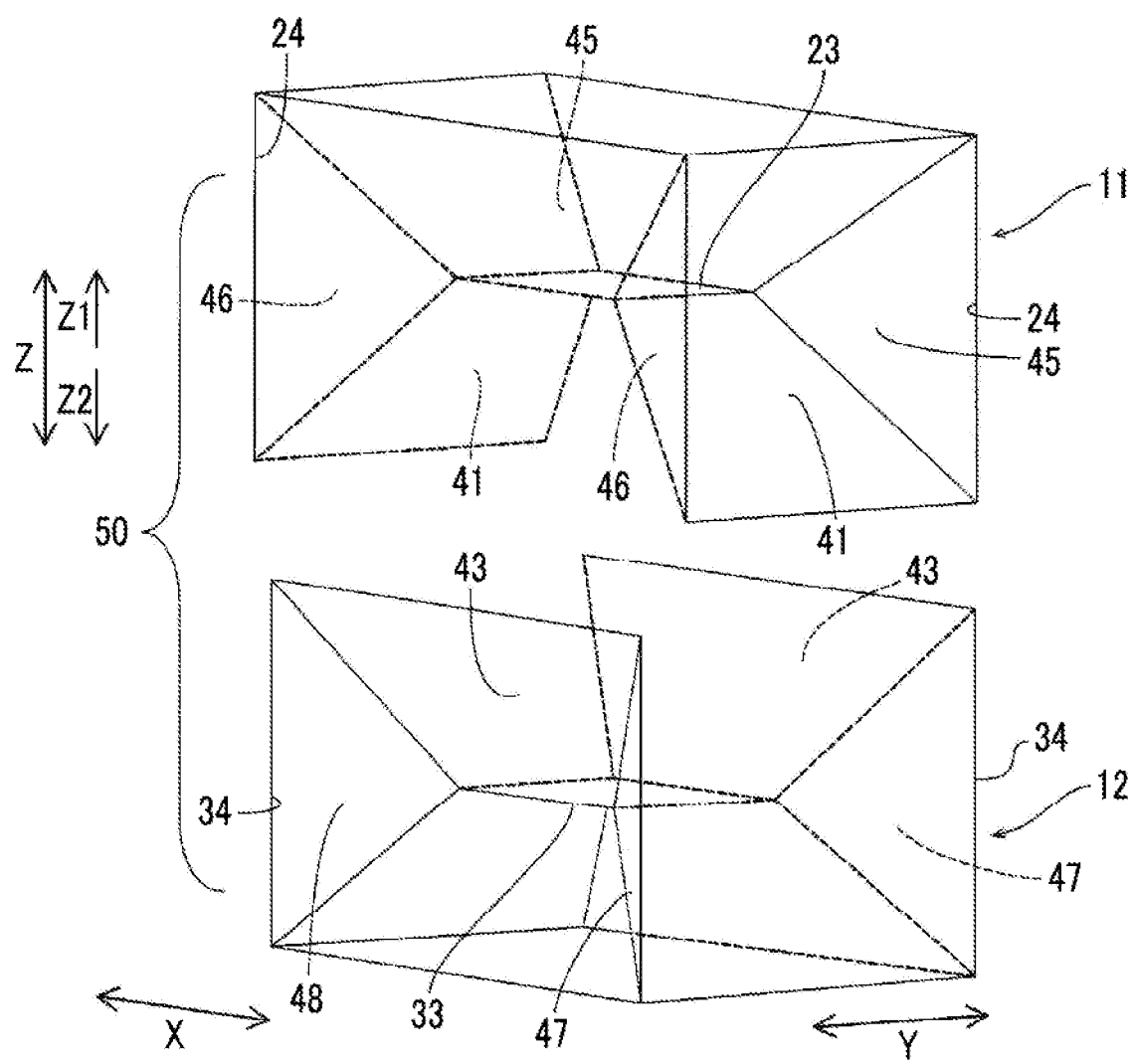
FIG. 12 is a schematic diagram for describing shapes of the first flow path and the second flow path included in the unit structure.

FIG. 12 is a schematic diagram in which the shape of the first flow path 11 and the shape of the second flow path 12 in the unit structure 50 are drawn separately. As illustrated in FIGS. 11 and 12, in the unit structure 50, the first flow path 11 extending in the X direction and the second flow path 12 extending in the Y direction are formed so as to intersect each other. Therefore, only one unit structure 50 can form an orthogonal flow type flow path layer 10 in which the first flow path 11 and the second flow path 12 disposed in the same layer intersect each other. The flow path layer 10 may be composed of one unit structure 50.

The unit structure 50 illustrated in FIG. 11 has a rectangular parallelepiped shape having a predetermined height in the Z direction as well as expanding in the X direction and the Y direction. The height of the unit structure 50 in the Z direction corresponds to the height (thickness) of the flow path layer 10. The unit structure 50 has a first end surface 50A on one side in the X direction and a second end surface 50B on the other side in the X direction. The unit structure 50 has a third end surface 50C on one side in the Y direction and a fourth end surface 50D on the other side in the Y direction.

In the unit structure 50, the first flow path 11 and the second flow path 12 each have the second portions 24 and 34 having a flow path cross-sectional area larger than those of the first portions 23 and 33 at both ends.

Figure 13:
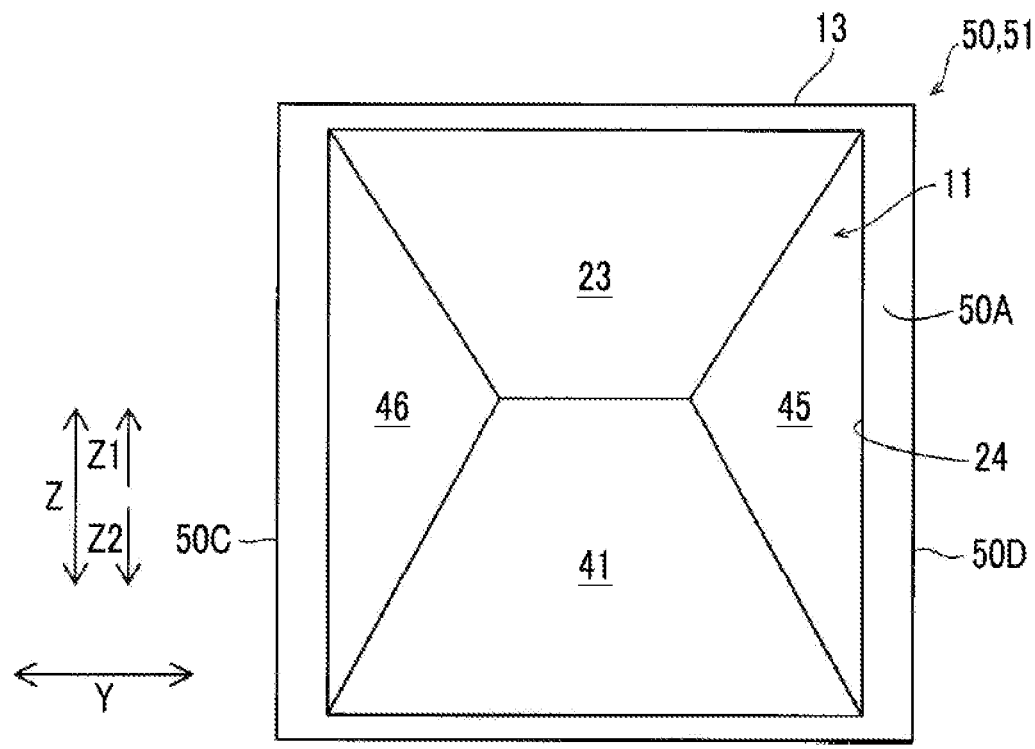
FIG. 13 is a side view of the unit structure of FIG. 11 as viewed from the X direction.
Figure 16:
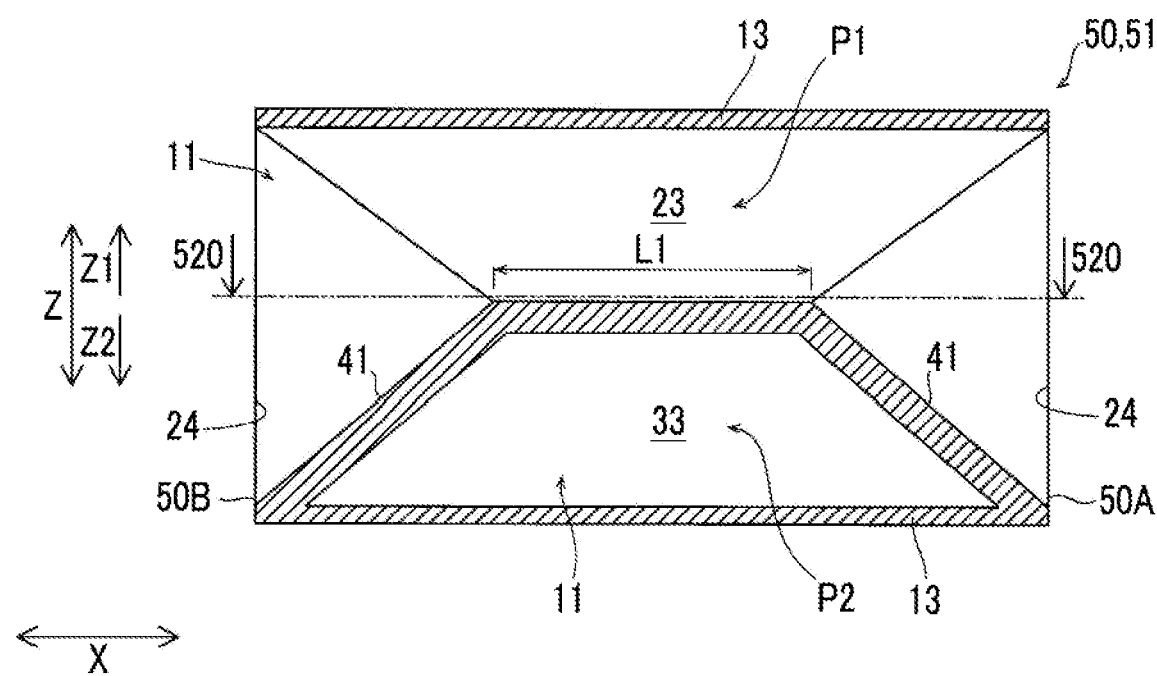
FIG. 16 is a cross-sectional view of the unit structure of FIG. 11 as viewed from the Y direction.
Figure 17:
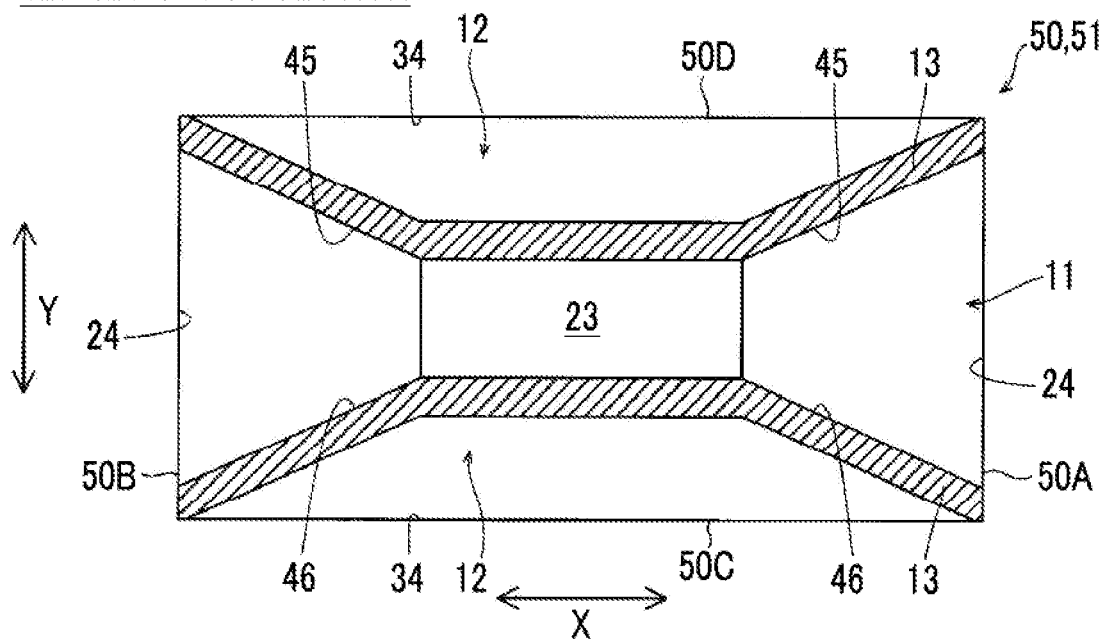
FIG. 17 is a cross-sectional view taken along line 520-520 of FIG. 16.

Specifically, as illustrated in FIG. 16, the first flow path 11 extends in the X direction in the unit structure 50 and opens to the first end surface 50A and the second end surface 50B on the X direction side of the unit structure 50. The first flow path 11 has the second portion 24 on each of the first end surface 50A and the second end surface 50B of the unit structure 50. The second portions 24 have the same cross-sectional shape. The first flow path 11 has the first portion 23 between two second portions 24 at both ends in the X direction. The first portion 23 and the second portion 24 are connected by inclined surfaces 41, 45, and 46 of the partition wall 13, as illustrated in FIGS. 13 and 17.

Figure 14:
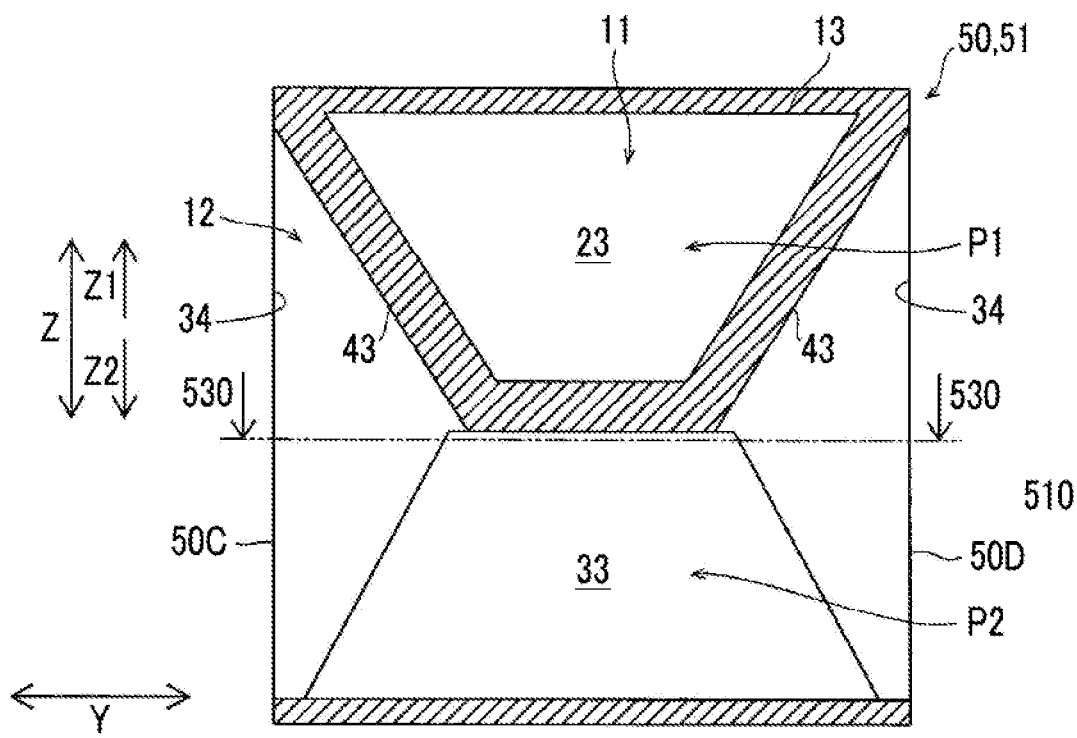
FIG. 14 is a cross-sectional view of the unit structure of FIG. 11 as viewed from the X direction.
Figure 15:
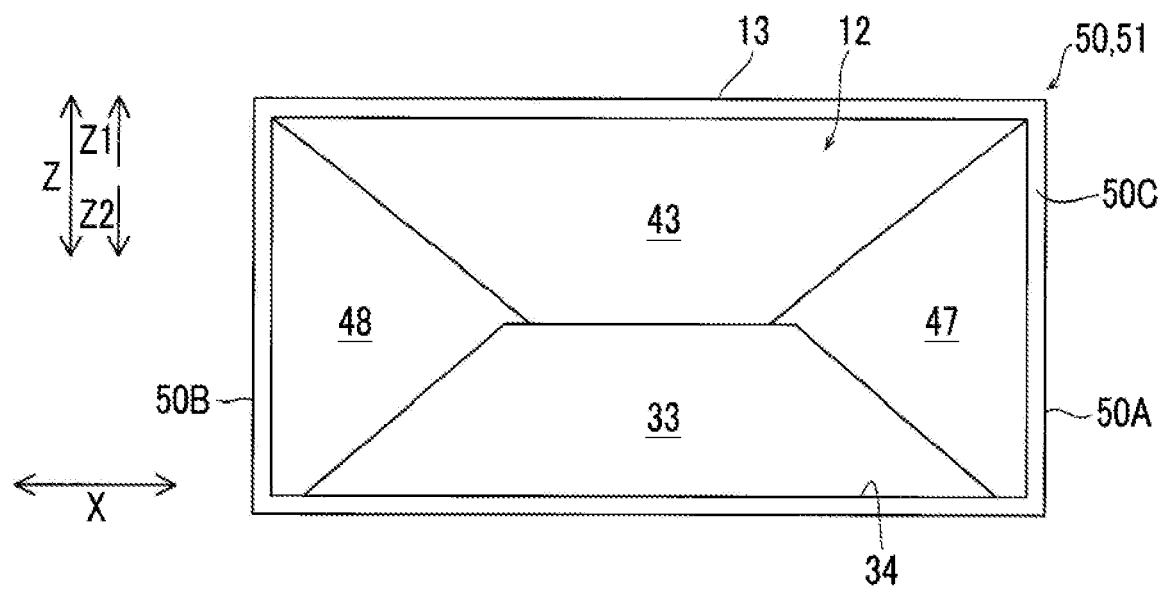
FIG. 15 is a side view of the unit structure of FIG. 11 as viewed from the Y direction.
Figure 18:
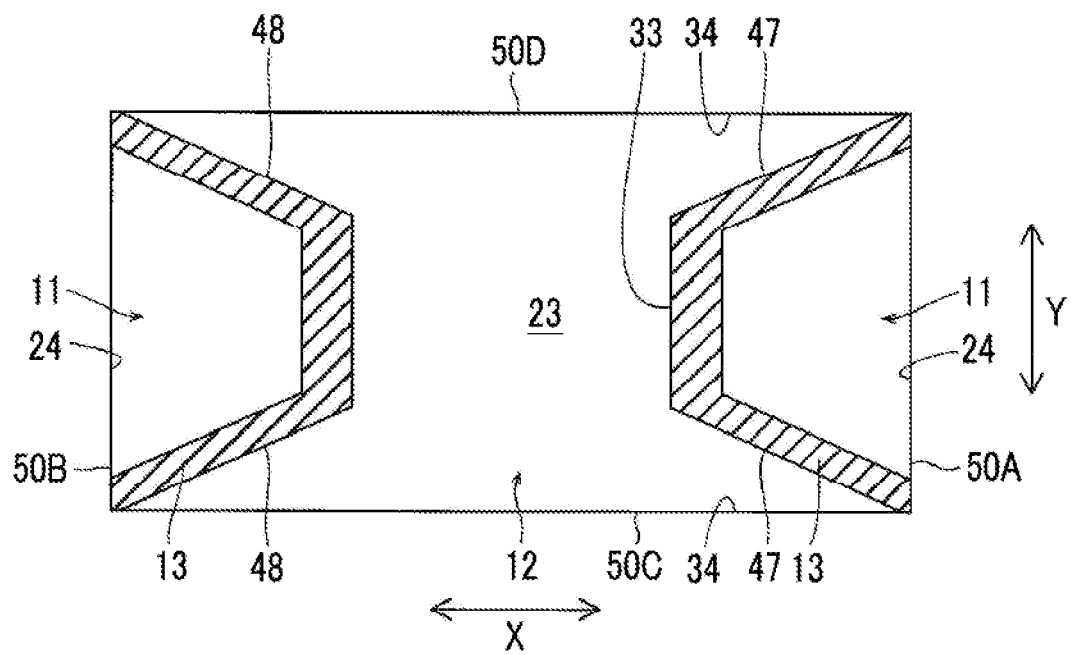
FIG. 18 is a cross-sectional view taken along line 530-530 of FIG. 14.

As illustrated in FIG. 14, the second flow path 12 extends in the Y direction in the unit structure 50 and opens to the third end surface 50C and the fourth end surface 50D on the Y direction side of the unit structure 50. The second flow path 12 has the second portion 34 on each of the third end surface 50C and the fourth end surface 50D of the unit structure 50. The second portions 34 have the same cross-sectional shape. The second flow path 12 has the first portion 33 between two second portions 34 at both ends in the Y direction. The first portion 33 and the second portion 34 are connected by inclined surfaces 43, 47, and 48 of the partition wall 13, as illustrated in FIGS. 15 and 18.

In the unit structure 50, the first portion 23 of the first flow path 11 is displaced to one side in the Z direction with respect to the first portion 33 of the second flow path 12, and the first portion 33 of the second flow path 12 is displaced to the other side in the Z direction with respect to the first portion 23 of the first flow path 11. As a result, in the unit structure 50, the first flow path 11 and the second flow path 12 intersect each other in the first portions 23 and 33 thereof.

<Arrangement of Plurality of Unit Structures>

By arranging the unit structures 50 in the X direction, a flow path length of the first flow path 11 can be arbitrarily set. That is, the first flow path 11 is configured to extend in the X direction by connecting the second portions 24 of the plurality of unit structures 50 to each other. Specifically, the second portion 24 of the second end surface 50B of one unit structure 50 and the second portion 24 of the first end surface 50A of one adjacent unit structure 50 are connected to each other.

When the first flow path 11 is formed by the plurality of unit structures 50, the flow path layer 10 is formed with the number of second flow paths 12 corresponding to the number of arrangements of the unit structures 50 in the X direction. The first flow path 11 intersects each second flow path 12. In the flow path layer 10 of FIGS. 1 and 6 to 8, one first flow path 11 is configured by arranging four unit structures 50 in the X direction. As a result, one first flow path 11 intersects four second flow paths 12.

Similarly, by arranging the unit structures 50 in the Y direction, a flow path length of the second flow path 12 can be arbitrarily set. That is, the second flow path 12 is configured to extend in the Y direction by connecting the second portions 24 of the plurality of unit structures 50 to each other. Specifically, the second portion 34 of the third end surface 50C of one unit structure 50 and the second portion 34 of the fourth end surface 50D of one adjacent unit structure 50 are connected to each other.

When the second flow path 12 is formed by the plurality of unit structures 50, the flow path layer 10 is formed with the number of first flow paths 11 corresponding to the number of arrangements of the unit structures 50 in the Y direction. The second flow path 12 intersects each first flow path 11. In the flow path layer 10 of FIGS. 1, 4, 9 and 10, one second flow path 12 is configured by arranging four unit structures 50 in the Y direction. As a result, one second flow path 12 intersects four first flow paths 11.

<Formation of Meandering Flow Path by Unit Structure>

As illustrated in FIGS. 4 and 6, when the first flow path 11 and the second flow path 12 meander in the Z direction, the flow path layer 10 may be configured by a combination of at least two types of unit structures 50 having different positions of the first portions 23 and 33 in the Z direction.

Figure 19:
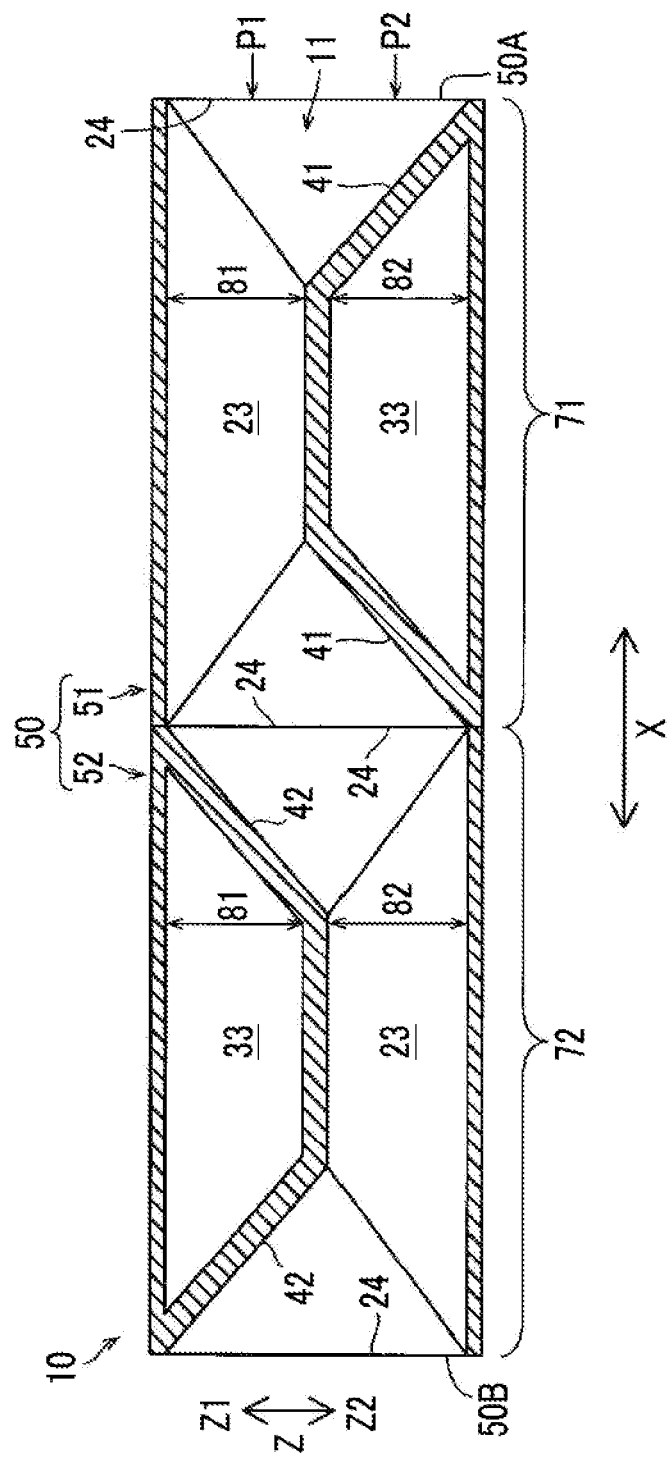
FIG. 19 is a cross-sectional view for describing the first flow path by a combination of a first structure and a second structure.
Figure 20:
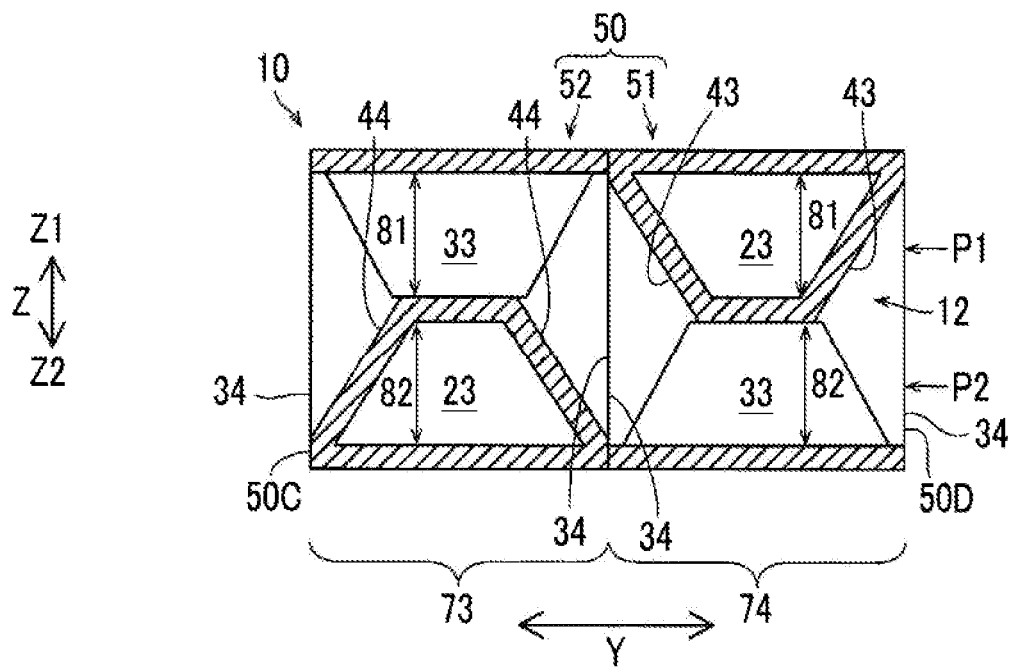
FIG. 20 is a cross-sectional view for describing a second flow path by the combination of the first structure and the second structure.

That is, in the examples of FIGS. 19 and 20, the unit structure 50 includes a first structure 51 and a second structure 52 in which the first structure 51 is inverted. The first structure 51 and the second structure 52 have structurally the same shape. The second structure 52 is obtained by inverting the first structure 51 in the Z direction. FIGS. 11 to 18 illustrate the first structure 51. As illustrated in FIGS. 19 and 20, the second structure 52 includes inclined surfaces 42 and 44 in place of the inclined surfaces 41 and 43 of the first structure 51.

In the first structure 51, the first portion 23 of the first flow path 11 is disposed on one side in the Z direction (Z1 direction side), and the first portion 33 of the second flow path 12 is disposed on the other side in the Z direction (Z2 direction side). That is, the first structure 51 includes the first portion 23 disposed at the first position P1 and the first portion 33 disposed at the second position P2. The region 71 of FIG. 6 and the region 74 of FIG. 4 are formed by the first structure 51.

In the second structure 52, the first portion 23 of the first flow path 11 is disposed on the other side in the Z direction (Z2 direction side), and the first portion 33 of the second flow path 12 is disposed on one side in the Z direction (Z1 direction side). That is, the second structure 52 includes the first portion 23 disposed at the second position P2 and a first portion 33 disposed at the first position P1. The region 72 of FIG. 6 and the region 73 of FIG. 4 are formed by the second structure 52.

Then, as illustrated in FIGS. 19 and 20, the flow path layer 10 has a structure in which the first structure 51 and the second structure 52 are arranged so as to be aligned alternately in at least one of the X direction and the Y direction. As illustrated in FIG. 6, the first structure 51 and the second structure 52 are arranged alternately by two along the X direction, and a total of four structures are arranged. Similarly, as illustrated in FIG. 4, the first structure 51 and the second structure 52 are arranged alternately by two along the Y direction, and a total of four structures are arranged.

That is, in the flow path layer 10 of FIGS. 1 to 10, four unit structures 50 are arranged in the X direction, four unit structures 50 are arranged in the Y direction, and the flow path layer 10 is configured by 16 unit structures 50.

As a breakdown of the 16 unit structures 50, eight first structures 51 and eight second structures 52 are provided so as to appear alternately in the X direction and the Y direction, respectively. As illustrated in FIG. 2, the flow path layer 10 has a structure in which the first structure 51 and the second structure 52 are arranged in a checkered pattern. In FIG. 2, the flow path passing through the Z1 direction side (that is, the first position P1) is indicated by a solid line arrow, and the flow path passing through the Z2 direction side (that is, the second position P2) is indicated by a broken line arrow. The portion where the first flow path 11 illustrated by the solid line and the second flow path 12 illustrated by the broken line intersect each other is formed by the first structure 51. The portion where the first flow path 11 illustrated by the broken line and the second flow path 12 illustrated by the solid line intersect each other is formed by the second structure 52.

By arranging the flow path layers 10 configured in this way in the Z direction, the core portion 3 illustrated in FIG. 1 is configured. In each flow path layer 10, the same unit structure 50 is arranged in the Z direction. That is, as illustrated in FIGS. 4 and 6, the first structures 51 of each flow path layer 10 are arranged in the Z direction, and the second structures 52 of each flow path layer 10 are arranged in the Z direction. As a result, a structure is realized in which the first flow path 11 of any of the flow path layers 10 is adjacent to the second flow path 12 in another flow path layer 10 adjacent in the Z direction, and the second flow path 12 of any of the flow path layers 10 is adjacent to the first flow path 11 in another flow path layer 10 adjacent in the Z direction.

(Method of Forming Heat Exchanger)

The core portion 3 of the heat exchanger 100 may be, for example, a three-dimensional structure formed by a laminate shaping method. More specifically, the laminate shaping method is a powder laminate shaping method. The powder laminate shaping method, processing of spreading a powder material in layers, irradiating a portion to be shaped with a laser or an electron beam to melt the material and solidify the material to form a layered shaped portion is repeated in a lamination direction (shaping direction), and thus, the layered shaped portions are laminated in the lamination direction to form a three-dimensional structure. The powder material is a metal material such as iron-based, copper-based, titanium-based, and aluminum-based, and for example, aluminum (or aluminum alloy) is preferable from the viewpoint of weight, mechanical strength, heat transfer performance, and the like.

In the present embodiment, the core portion 3 can be configured as the heat exchanger 100 by being integrally formed (formed as a single component) by the laminate shaping method and then joined to the header portions 4A to 4D. Further, the entire heat exchanger 100 including the core portion 3 and the header portions 4A to 4D can be integrally formed by the laminate shaping method.

(Action of Heat Exchanger)

In the heat exchanger 100 configured as described above, the first fluid 1 introduced into each first flow path 11 from the header portion 4A alternately passes through the second portions 24 and the first portions 23 of the first flow path 11. Further, the first fluid 1 meanders in the Z direction so as to alternately pass through the first portion 23 of the first position P1 and the first portion 23 of the second position P2. While the first fluid 1 flows in the first flow path 11, heat exchange is performed between the first fluid 1 and the second fluid 2 flowing through each of the plurality of adjacent second flow paths 12. After the heat exchange, the first fluid 1 is discharged from the outlet opening 22 to the header portion 4B.

Then, the second fluid 2 introduced from the header portion 4C into each second flow path 12 alternately passes through the second portion 34 and the first portion 33 of the second flow path 12. Further, the second fluid 2 meanders in the Z direction so as to alternately pass through the first portion 33 of the first position P1 and the first portion 33 of the second position P2. While the second fluid 2 flows in the second flow path 12, heat exchange is performed between the second fluid 2 and the first fluid 1 flowing through each of the plurality of adjacent first flow paths 11. After the heat exchange, the second fluid 2 is discharged from the outlet opening 32 to the header portion 4D.

Inside the first flow path 11 and the second flow path 12, the flow turbulence occurs due to the change in the flow path cross-sectional area and the displacement in the Z direction, the temperature boundary layer is destroyed, and thus, the heat exchange is performed effectively. Further, the partition wall 13 that separates the first flow path 11 and the second flow path 12 constitutes the primary heat transfer surface over the entire surface. That is, since the primary heat transfer surface is formed not only by the boundary that partitions the adjacent flow path layers 10 but also by the partition wall 13 that partitions the flow paths in the same layer, the area of the primary heat transfer surface increases as compared with the conventional plate fin type heat exchanger. As a result, the heat exchange between the first fluid 1 and the second fluid 2 via the partition wall 13 is efficiently performed.

Effect of Present Embodiment

In the present embodiment, the following effects can be obtained.

In the present embodiment, as described above, each of the first flow path 11 and the second flow path 12 is displaced in the Z direction in the first portions 23 and 33 while reducing and expanding the flow path cross-sectional area. Accordingly, in each flow path, in addition to the change in the two-dimensional flow accompanying the change in the cross-sectional shape, the flow that changes three-dimensionally due to the change in the flow in the Z direction can be formed. As a result, flow turbulence for improving the heat transfer coefficient can be effectively formed. Then, the first flow path 11 and the second flow path 12 can be formed so as to intersect each other in the same layer by using the first portions 23 and 33 formed in each of the first flow path 11 and the second flow path 12 and displacing the positions of the first portions 23 and 33 in the Z direction. Therefore, unlike a structure (refer to FIG. 21) in which a heat transfer surface is formed only at a boundary between a first layer and a second layer as in the conventional plate fin type heat exchanger, the heat transfer surface between the first flow path 11 and the second flow path 12 can be formed in a single flow path layer 10. As a result, when the size of the heat exchanger of the present embodiment is the same as that of the conventional heat exchanger, the heat transfer area can increase as compared with the conventional heat exchanger, and when the heat transfer area thereof is the same as that of the conventional heat exchanger, the size and weight of the heat exchanger can be reduced as compared with the conventional heat exchanger. As a result of the above, according to the present embodiment, it is possible to improve the heat exchange efficiency while suppressing the increase in the size and weight of the heat exchanger.

Further, in the present embodiment, as described above, each of the first flow path 11 and the second flow path 12 is partitioned by the partition wall 13 bent so as to reduce and expand the flow path cross-sectional area. Therefore, it is not necessary to dispose fins to be secondary heat transfer surfaces in the flow path in order to change the flow path cross-sectional area, and the first flow path 11 and the second flow path 12 can be directly adjacent to each other via the partition wall 13. Since the first flow path 11 and the second flow path 12 are partitioned from each other by the common partition wall 13 in the same layer, the primary heat transfer surface can be configured by the partition wall 13 between the first flow path 11 and the second flow path 12 in the same layer. As a result, the primary heat transfer surface between the first flow path 11 and the second flow path 12 can effectively increase.

Further, in the present embodiment, as described above, each of the first flow path 11 and the second flow path 12 is partitioned by the partition wall 13 inclined such that the cross-sectional area continuously changes according to the position in the extending direction of the flow path. Accordingly, it is possible to smooth the change in the flow path cross-sectional area as compared with a structure in which the flow path cross-sectional area changes abruptly (at right angle) due to, for example, the partition wall 13 formed in a stepped shape. As a result, in the first flow path 11 and the second flow path 12, it is possible to suppress an excessive increase in pressure loss while forming a change in the flow that improves the heat exchange efficiency.

Further, in the present embodiment, as described above, the first flow path 11 is provided so as to be adjacent to the second flow path 12 in another flow path layer 10 adjacent in the Z direction, and the second flow path 12 is provided so as to be adjacent to the first flow path 11 in another flow path layer 10 adjacent in the Z direction. Accordingly, the first flow path 11 can be not only in the same layer but also adjacent to the second flow path 12 of another flow path layer 10, and the second flow path 12 can be not only in the same layer but also adjacent to the first flow path 11 of another flow path layer 10. Therefore, the heat transfer area between the first flow path 11 and the second flow path 12 can further increase, and thus, the heat exchange efficiency can be effectively improved.

Further, in the present embodiment, as described above, the first flow path 11 and the second flow path 12 meander such that a positional relationship between the first portion 23 of the first flow path 11 and the first portion 33 of the second flow path 12 intersecting each other in the Z direction alternates. Accordingly, each of the first flow path 11 and the second flow path 12 disposed in the same layer can be displaced a plurality of times in the Z direction. As a result, the flow can be changed in the Z direction a plurality of times in each flow path, and thus, the heat exchange efficiency can be effectively improved.

Further, in the present embodiment, as described above, the formation range 81 of each of the first portions 23 and 33 at the first position P1 in the Z direction and the formation range 82 of each of the first portions 23 and 33 at the second position P2 in the Z direction are offset so as not to overlap in the Z direction. Accordingly, in the first flow path 11, a region that linearly passes through the first portion 23 at the first position P1 and the first portion 23 at the second position P2 in the X direction is not formed. Similarly, in the second flow path 12, the region that passes linearly in the Y direction is not formed. Therefore, while the fluid passes through the first position P1 and the second position P2, it is possible to surely form a change in the flow in the Z direction.

Further, in the present embodiment, as described above, in each of the first flow path 11 and the second flow path 12, the first portions 23 and 33 and the second portions 24 and 34 are alternately disposed along the extending direction of the flow path. Accordingly, the reduction of the flow path cross-sectional area in each of the first portions 23 and 33 and the expansion of the flow path cross-sectional area in each of the second portions 24 and 34 can be alternately generated a plurality of times. Therefore, the change of the flow accompanying the change of the cross-sectional shape can be effectively generated.

Further, in the present embodiment, as described above, in each of the first flow path 11 and the second flow path 12, the inlet openings 21 and 31 or the outlet openings 22 and 34 are configured by the second portions 24 and 34 disposed at the end portion of the flow path. Accordingly, the fluid can be introduced into or out of the flow path from the enlarged second portions 24 and 34 at the end portion of the flow path. Accordingly, it possible to secure a sufficient opening area for introducing and deriving the fluid even in a structure in which the flow path cross-sectional area changes.

Further, in the present embodiment, as described above, the flow path layer 10 has the inlet openings 21 of the plurality of first flow path 11 on the first end surface 10A on the X direction side and the outlet openings 22 of the plurality of first flow paths 11 on the second end surface 10B on the X direction side, and the flow path layer 10 has the inlet openings 21 of the plurality of second flow paths 12 on the third end surface 10C on the Y direction side and the outlet openings 32 of the plurality of second flow paths 12 on the fourth end surface 10D on the Y direction side. As a result, the inlet openings 21 and 31 or the outlet openings 22 and 32 of the flow path can be collectively formed on the same end surface of each flow path layer 10, and thus, the area covered by the header portions 4A to 4D and the total area of the openings can be brought close to each other. As a result, it is possible to suppress the occurrence of pressure loss at the inlet openings 21 and 31 of the flow path.

Figure 21:
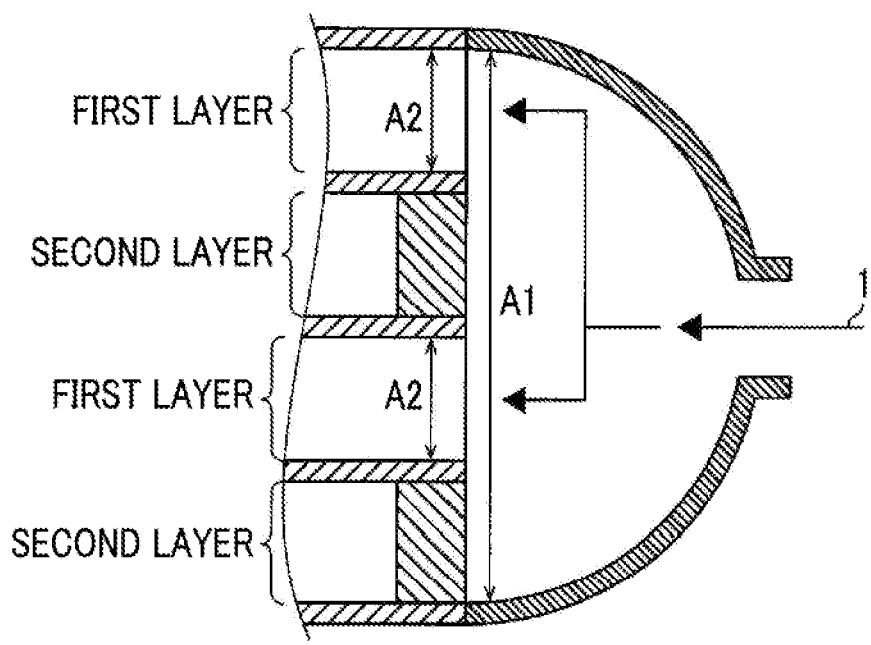
FIG. 21 is a schematic view of an inlet opening portion of a plate fin type heat exchanger according to a comparative example.
Figure 22:
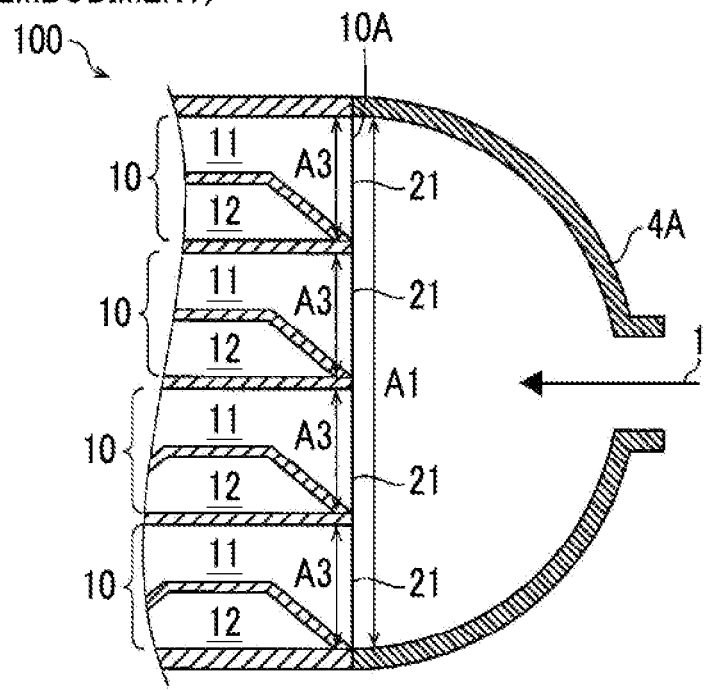
FIG. 22 is a schematic view of an inlet opening portion in the heat exchanger of the present embodiment.

That is, in a structure in which the first layer and the second layer are alternately provided like the comparative example of the plate fin type heat exchanger illustrated in FIG. 21, in general, the inlet openings of the flow path are formed every other layer, and each inlet opening is collectively covered by a header portion for connection with an external pipe. In this case, since the total area (2×A2) of the opening portions is smaller than the area A1 covered by the header portion, the flow path is sharply narrowed between the header portion and the inlet opening, resulting in pressure loss. Meanwhile, in the heat exchanger 100 of the present embodiment illustrated in FIG. 22, substantially the entire surface of the first end surface 10A is the inlet opening 21, the area A1 covered by the header portion 4A and the total area (4×A3) of the opening portions are close to each other, the pressure loss associated with the introduction of the fluid can be reduced. The same applies to the third end surface 10C illustrated in FIG. 5.

Further, in the present embodiment, as described above, the flow path layer 10 is configured by arranging the plurality of unit structures 50. Accordingly, it is possible to form the flow path layer 10 including the first flow path 11 and the second flow path 12 that intersect each other while changing the flow path cross-sectional area in the same layer with a simple structure in which unit structures 50 are arranged. Then, a heat exchanger having an arbitrary number of flow paths and an arbitrary flow path length can be easily obtained only by increasing or decreasing the number of the unit structures 50. As a result, even in a heat exchanger having a novel structure in which the shape of the flow path changes three-dimensionally, the design of the heat exchanger can be extremely facilitated.

Further, in the present embodiment, as described above, the flow path layer 10 has the structure in which the first structure 51 and the second structure 52 are arranged in the X direction and the Y direction. Accordingly, only by arranging two types of unit structures 50, the first structure 51 and the second structure 52 that is the inverted structure of the first structure 51, it is possible to realize the structure in which the first flow path 11 or the second flow path 12 meanders in the Z direction in the same layer. Thereby, even the structure including the flow path meandering in the Z direction can be easily designed.

Further, in the present embodiment, as described above, the first flow path 11 is configured to extend in the X direction by connecting the second portions 24 of the plurality of unit structures 50, and the second flow path 12 is configured to extend in the Y direction by connecting the second portions 34 of the plurality of unit structures 50. Accordingly, it is possible to easily realize the structure in which the reduction and expansion of the flow path cross-sectional area alternately occur only by connecting the second portions 24 and 34 in the unit structure 50.

Modification Example

It should be noted that the embodiment described here is exemplary in all respects and is not considered to be restrictive. A scope of the present invention is illustrated by claims rather than the descriptions of the above-described embodiment, and further includes all modifications (modification examples) within the meaning and scope equivalent to the claims.

For example, in the above embodiment, the example in which the plurality of flow path layers 10 are arranged in the Z direction is illustrated, but the present invention is not limited to this. In the present invention, only one flow path layer 10 may be provided.

Further, in the above embodiment, the dimensions of each portion of the unit structure 50 are not limited to those illustrated in the drawings, and may be arbitrarily changed. For example, the flow path length in the unit structure 50 is arbitrary. In the above embodiment, the example is described in which the flow path length of the first flow path 11 in the X direction is larger than the flow path length of the second flow path 12 in the Y direction (that is, the dimension of the unit structure 50 in the X direction is larger than the dimension thereof in the Y direction dimension). However, the flow path lengths may be the same, or the flow path length of the first flow path 11 may be smaller than the flow path length of the second flow path 12.

Figure 23:
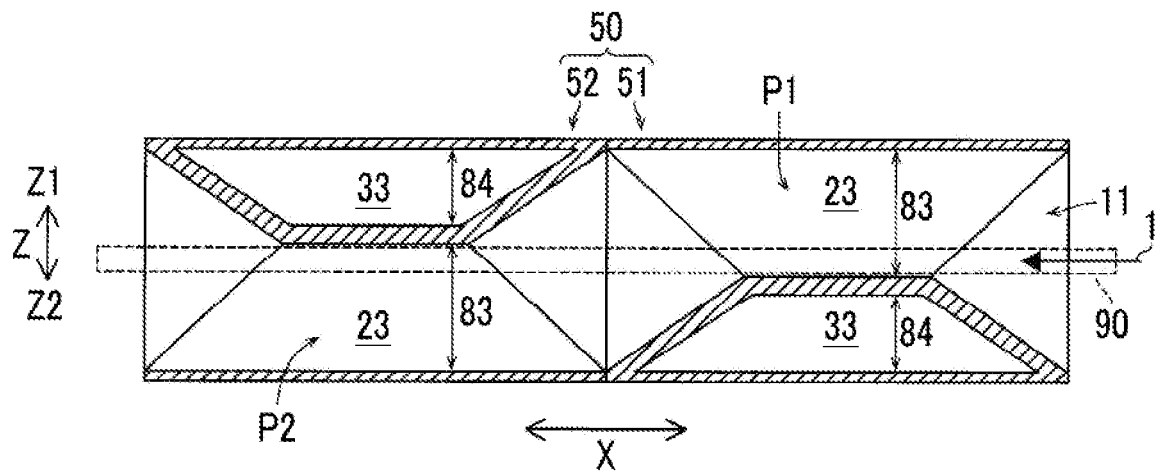
FIG. 23 is a schematic diagram illustrating a modification example of the formation range (height) of a first portion.

Further, the formation range of the first portion 23 in the unit structure 50 in the Z direction is arbitrary. For example, in FIG. 19, the first portion 23 of the first flow path 11 and the first portion 33 of the second flow path 12 are formed so as to divide the height of the unit structure 50 in the Z direction into two equal parts. However, as illustrated in FIG. 23, the formation range of any one of the first portion 23 and the first portion 33 may be reduced, and the formation range of any one may increase. FIG. 23 illustrates an example in which the formation range 84 of the first portion 33 is reduced and the formation range 83 of the first portion 23 increases, but the reverse relationship may be used.

In this case, in the flow path (first flow path 11 in FIG. 23) in which the formation range of the first portion in the Z direction increases, the formation range 83 of the first portion 23 overlaps in the Z direction at the first position P1 and the second position P2. Therefore, a region that linearly penetrates from the inlet opening to the outlet opening is formed in the flow path, and the effect of meandering the flow in the flow path in the Z direction is reduced. From the viewpoint of improving the heat exchange efficiency, as in the above embodiment (refer to FIG. 19), it is preferable that the formation ranges of the first portions 23 and 33 in the Z direction do not overlap in the Z direction at the first position P1 and the second position P2. Meanwhile, in the configuration of FIG. 23, the region 90 through which the fluid can flow linearly is partially formed, and thus, the pressure loss can be reduced. Therefore, when priority is given to reducing the pressure loss in any of the flow paths in consideration of the types, the flow rates, and the amounts of heat exchange of the first fluid 1 and the second fluid 2 for the heat exchange, the configuration illustrated in FIG. 23 may be adopted.

Figure 24:
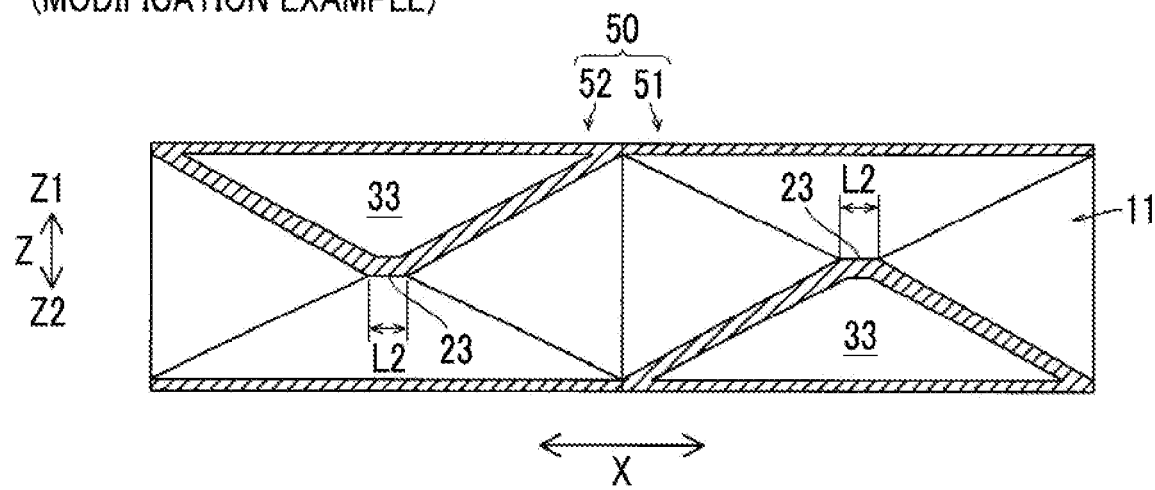
FIG. 24 is a schematic diagram illustrating a modification example of the length of the first portion.

In addition, for example, the length of the first portion 23 in the unit structure 50 is arbitrary. For example, as illustrated in FIG. 24, a length L1 of the first portion 23 of the first flow path 11 illustrated in FIG. 16 may be a smaller length L2 or a larger length (not illustrated). The same applies to the first portion 33 of the second flow path 12.

Figure 25:
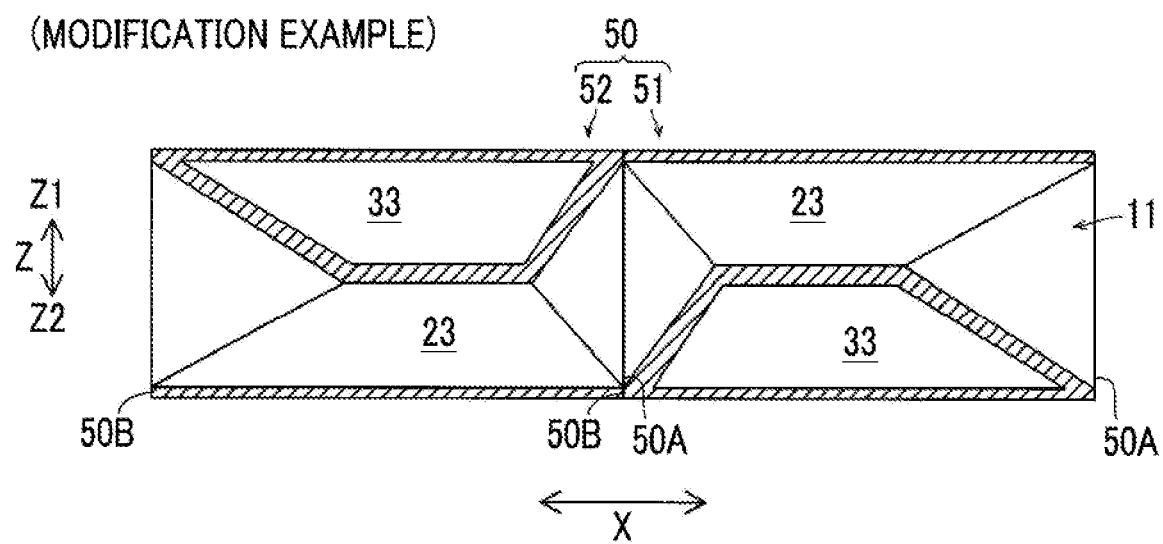
FIG. 25 is a schematic diagram illustrating a modification example of a formation position of the first portion.

Further, the position of the first portion 23 in the unit structure 50 in the extending direction of the flow path is arbitrary. For example, the first portion 23 of the first flow path 11 in FIG. 16 is disposed in the center of the unit structure 50 in the X direction, but as illustrated in FIG. 25, the first portion 23 may be disposed at a position biased to either the first end surface 50A side or the second end surface 50B side. The same applies to the first portion 33 of the second flow path 12.

Further, in the above embodiment, the example is illustrated in which the partition wall 13 for partitioning the first flow path 11 and the second flow path 12 is bent in a polygonal line, but the present invention is not limited to this. In the present invention, the partition wall 13 may be bent (curved) in a curved shape.

Further, in the above embodiment, the example in which the inclined partition wall 13 is provided such that the flow path cross-sectional areas of the first flow path 11 and the second flow path 12 change continuously is illustrated, but the present invention is not limited to this. For example, a stepped partition wall (partition wall having a stepped shape) may be provided such that the flow path cross-sectional area changes stepwise.

Further, in the above embodiment, the example is illustrated in which the first flow path 11 is adjacent to the second flow path 12 in another flow path layer 10 and the second flow path 12 is adjacent to the first flow path 11 in another flow path layer 10, but the present invention is not limited to this. The first flow path 11 may be provided so as to be adjacent to the first flow path 11 of another flow path layer 10. Similarly, the second flow path 12 may be provided so as to be adjacent to the second flow path 12 of another flow path layer 10.

Further, in the above embodiment, the example is illustrated in which the positional relationship in the Z direction between the first portion 23 of the first flow path and the first portion 33 of the second flow path 12 intersecting each other alternates, but the present invention is not limited to this. In the present invention, the positional relationship between the first portion 23 of the first flow path 11 and the first portion 33 of the second flow path 12 in the Z direction does not have to be alternated. For example, the first flow path 11 or the second flow path 12 may be configured by connecting a plurality of only one of the first structure 51 and the second structure 52. Further, for example, the first flow path 11 or the second flow path 12 may be configured such that the number of the first structures 51 and the number of the second structures 52 may be different from each other, such as a combination of two first structures 51 and one second structure 52.

Further, in the above embodiment, the example in which the inlet opening 21 or the outlet opening 22 is configured by the second portions 24 and 34 is illustrated, but the inlet opening 21 or the outlet opening 22 may be configured by the first portions 23 and 33.

Further, in the above embodiment, the example is illustrated in which the inlet opening 21 of the first flow path 11 is provided on the first end surface 10A of the flow path layer 10 and the outlet opening 22 of the first flow path 11 is provided on the second end surface 10B, but the present invention is not limited to this. For example, the first flow path 11 may be U-turned from the second end surface 10B side to the first end surface 10A side, and both the inlet opening 21 and the outlet opening 22 of the first flow path 11 may be provided on the first end surface 10A. The same applies to the second flow path 12.

Further, in the above embodiment, the example in which the flow path layer 10 is configured by arranging the plurality of unit structures 50 is illustrated, but the present invention is not limited to this. It is not necessary to form the flow path layer 10 by the arrangement of the unit structure 50. That is, the flow path layer 10 may be configured not to have a structure in which a pattern having a specific flow path shape is repeated, but may be configured to have a structure in which the pattern from one end to the other end of the flow path does not have a repeating pattern.

Further, in the above embodiment, the example is illustrated in which the flow path layer 10 is configured by two types of unit structures 50, that is, the first structure 51 and the second structure 52, but the present invention is not limited to this. In the present invention, the flow path layer 10 may be configured by a combination of three or more types of unit structures.

Further, in the above embodiment, the example in which the flow path layer 10 includes the first flow path 11 and the second flow path 12 is illustrated, but the present invention is not limited to this. In the present invention, the flow path layer 10 may include, in addition to the first flow path 11 and the second flow path 12, a third flow path through which the third fluid flows. The flow path layer 10 may be configured to allow any kind of fluid to flow, and may include the flow paths having the number (type) according to the type of fluid.

REFERENCE SIGNS LIST

1: first fluid
2: second fluid
10: flow path layer
10A: first end surface
10B: second end surface
10C: third end surface
10D: fourth end surface
11: first flow path
12: second flow path
13: partition wall
21: inlet opening
22: outlet opening
23: first portion
24: second portion
31: inlet opening
32: outlet opening
33: first portion
34: second portion
50: unit structure
50A: first end surface
50B: second end surface
50C: third end surface
50D: fourth end surface
51: first structure
52: second structure
81: formation range
82: formation range
100: heat exchanger
P1: first position
P2: second position

The invention claimed is:

1. A heat exchanger with variable cross sectional flow path areas comprising a flow path layer in which a first flow path which has a tubular shape extending in a first direction and through which a first fluid flows and a second flow path which has a tubular shape extending in a second direction intersecting the first direction and through which a second fluid exchanging heat with the first fluid flows are disposed,
wherein each of the first flow path and the second flow path includes a first portion and a second portion,
the first portion of the first flow path is smaller in both a first width, and a height than the second portion of the first flow path, the first width being a length in the second direction, the height being a length is a third direction intersecting the first direction and the second direction, and
the first portion of the second flow path is smaller in both a second width, and the height than the second portion of the second flow path, the second width being a length in the first direction, the first portion of the first path and the first portion of the second flow path overlap with each other in the third direction in the flow path layer.

2. The heat exchanger with variable cross sectional flow path areas according to claim 1,
wherein each of the first flow path and the second flow path is formed by partitioning the flow path layer with a partition wall bent so as to reduce or expand both of the width and the height of the first flow path of the second flow path, and
the first flow path and the second flow path are formed by partitioning the flow path layer by the single partition wall.

3. The heat exchanger with variable cross sectional flow path areas according to claim 2,
wherein the first flow path and the second flow path are formed by partitioning the flow path layer by the partition wall inclined such that the cross-sectional area continuously changes according to a position in the extending direction of the flow path.

4. The heat exchanger with variable cross sectional flow path areas according to claim 1, further comprising a plurality of the flow path layers arranged in the third direction,
wherein the first flow path is provided so as to be adjacent to the second flow path in the same layer and adjacent to the second flow path in another flow path layer adjacent to the third direction, and
the second flow path is provided so as to be adjacent to the first flow path in the same layer and adjacent to the first flow path in another flow path layer adjacent to the third direction.

5. The heat exchanger with variable cross sectional flow path areas according to claim 1,
wherein the flow path layer includes a plurality of the first flow paths arranged in the second direction and a plurality of the second flow paths arranged in the first direction,
each of the first flow path and the second flow path has a plurality of the first portions along the extending direction of the flow path, and
the first flow path and the second flow path meander such that a positional relationship between the first portion of the first flow path and the first portion of the second flow path intersecting each other in the third direction alternates.

6. The heat exchanger with variable cross sectional flow path areas according to claim 5,
wherein the first flow path and the second flow path meander such that the first portion is displaced between a first position and a second position in the third direction according to a position in the extending direction of the flow path, and
a formation range of the first portion at the first position in the third direction and a formation range of the first portion at the second position in the third direction are offset so as not to overlap in the third direction.

7. The heat exchanger with variable cross sectional flow path areas according to claim 1,
wherein the flow path layer includes a plurality of the first flow paths arranged in the second direction and a plurality of the second flow paths arranged in the first direction,
each of the first flow path and the second flow path has a plurality of the first portions and the plurality of second portions,
the first portion of the first flow path and the second portion of the first flow path are alternately disposed along the extending direction of the first flow path, and
the first portion of the second flow path and the second portion of the second flow path are alternately disposed along the extending direction of the second flow path.

8. The heat exchanger with variable cross sectional flow path areas according to claim 7,
wherein in each of the first flow path and the second flow path, an inlet opening or an outlet opening is configured by the second portion disposed at an end portion of the flow path.

9. The heat exchanger with variable cross sectional flow path areas according to claim 8, further comprising a plurality of the flow path layers arranged in the third direction,
wherein the flow path layer has the inlet openings of the plurality of first flow paths on a first end surface on a first direction side, and the outlet openings of the plurality of first flow paths on a second end surface on the first direction side, and
the flow path layer has the inlet openings of the plurality of second flow paths on a third end surface on a second direction side, and the outlet openings of the plurality of second flow paths on a fourth end surface on the second direction side.

10. The heat exchanger with variable cross sectional flow path areas according to claim 1,
wherein the flow path layer is configured by arranging a plurality of unit structures, each unit structure including one first flow path including one first portion and one second flow path including one first portion.

11. The heat exchanger with variable cross sectional flow path areas according to claim 10,
wherein the unit structure includes
a first structure in which the first portion of the first flow path is disposed on one side of the third direction and the first portion of the second flow path is disposed on the other side of the third direction, and
a second structure in which the first portion of the first flow path is disposed on the other side of the third direction and the first portion of the second flow path is disposed on the one side of the third direction and which is an inverted structure of the first structure, and
the flow path layer has a structure in which the first structure and the second structure are arranged so as to be aligned alternately in at least one of the first direction and the second direction.

12. The heat exchanger with variable cross sectional flow path areas according to claim 10,
wherein in the unit structure,
each of the first flow path and the second flow path has the second portion at both ends,
the first flow path is configured to extend in the first direction by connecting the second portions of the plurality of unit structures, and
the second flow path is configured to extend in the second direction by connecting the second portions of the plurality of unit structures.

* * * * *